United States Patent
Wilson et al.

(10) Patent No.: US 8,313,600 B2
(45) Date of Patent: Nov. 20, 2012

(54) METHOD AND SYSTEM FOR FORMING COMPOSITE GEOMETRIC SUPPORT STRUCTURES

(75) Inventors: Erich A. Wilson, Provo, UT (US);
Michael D. Kipp, Highland, UT (US);
Michael D. Ridges, American Fork, UT (US)

(73) Assignee: Sigma-Tek, LLC, Provo, UT (US)

( * ) Notice: Subject to any disclaimer, the term of this patent is extended or adjusted under 35 U.S.C. 154(b) by 451 days.

(21) Appl. No.: 12/542,607

(22) Filed: Aug. 17, 2009

(65) Prior Publication Data

US 2010/0065192 A1 Mar. 18, 2010

Related U.S. Application Data

(60) Provisional application No. 61/089,125, filed on Aug. 15, 2008.

(51) Int. Cl.
*B32B 37/00* (2006.01)

(52) U.S. Cl. ........ 156/175; 156/169; 156/173; 156/425; 156/433; 156/286

(58) Field of Classification Search .................. 156/166, 156/169, 173, 175, 285, 425, 433, 441, 286, 156/382

See application file for complete search history.

(56) References Cited

U.S. PATENT DOCUMENTS

| | | | |
|---|---|---|---|
| 31,777 A | 3/1861 | Boynton |
| 1,766,961 A | 6/1930 | Steuart |
| 1,818,423 A | 8/1931 | Mummert |
| 1,975,726 A | 10/1934 | Martinage |
| 2,060,387 A | 11/1936 | Meek |
| 2,114,274 A | 4/1938 | Huppert |
| 2,157,042 A | 5/1939 | Wallis |
| 2,456,513 A | 12/1948 | Johnson |
| 2,639,876 A | 5/1953 | Misfeldt |

(Continued)

FOREIGN PATENT DOCUMENTS

GB 1174920 12/1969

(Continued)

OTHER PUBLICATIONS

U.S. Appl. No. 13/108,873, filed May 16, 2011; Erich A. Wilson.

(Continued)

*Primary Examiner* — Jeff Aftergut
(74) *Attorney, Agent, or Firm* — Thorpe North & Western LLP

(57) ABSTRACT

A method and system for fabricating a geometrically versatile composite lattice support structure having a seamless three-dimensional configuration. The lattice support structure is created by forming two or more cross supports, such as helical, longitudinal, circumferential and/or lateral cross supports, which intersect to form a plurality of multi-layered nodes. The lattice support structure may be designed without any protrusions extending outward from the overall geometry, thus enabling efficient tooling, and thus enabling ease of mass production. The lattice support structure may comprise a completely circumferentially closed geometry, such as a cylinder, ellipse, airfoil, etc. The method for fabricating the lattice support structure comprises laying up a fiber material, in the presence of resin, within rigid channels of a rigid mold, thus creating a green, uncured three-dimensional geometry of unconsolidated cross supports and multi-layered nodes where these intersect. Subjecting these to a curing system functions to consolidate the cross supports and multi-layered nodes to produce the composite lattice support structure.

25 Claims, 16 Drawing Sheets

U.S. PATENT DOCUMENTS

| | | | |
|---|---|---|---|
| 3,007,497 A | 11/1961 | Shobert | |
| 3,208,539 A | 9/1965 | Henderson | |
| 3,300,354 A | 1/1967 | Duft | |
| 3,336,181 A | 8/1967 | Falkenau et al. | |
| 3,475,266 A | 10/1969 | Strassel | |
| 3,616,193 A | 10/1971 | Lubowitz et al. | |
| 3,644,866 A | 2/1972 | Deardurff | |
| 3,645,833 A | 2/1972 | Figge | |
| 3,857,415 A | 12/1974 | Morin et al. | |
| 3,887,739 A | 6/1975 | Kromrey | |
| 3,930,097 A | 12/1975 | Alberino et al. | |
| 3,940,891 A | 3/1976 | Slysh | |
| 3,948,575 A | 4/1976 | Rosser | |
| 3,962,393 A * | 6/1976 | Blad | 264/571 |
| 4,018,733 A | 4/1977 | Lopez et al. | |
| 4,025,675 A | 5/1977 | Jonda | |
| 4,028,310 A | 6/1977 | Schafer et al. | |
| 4,036,539 A | 7/1977 | Saunders et al. | |
| 4,086,378 A * | 4/1978 | Kam et al. | 428/34.5 |
| 4,118,262 A | 10/1978 | Abbott | |
| 4,130,542 A | 12/1978 | Chang et al. | |
| 4,137,354 A | 1/1979 | Mayes, Jr. et al. | |
| 4,146,559 A | 3/1979 | Bock et al. | |
| 4,211,595 A | 7/1980 | Samour | |
| 4,216,047 A | 8/1980 | Hilliard et al. | |
| 4,217,394 A | 8/1980 | Newkirk et al. | |
| 4,218,543 A | 8/1980 | Weber et al. | |
| 4,254,599 A | 3/1981 | Maistre | |
| 4,260,143 A | 4/1981 | Kliger | |
| 4,278,485 A | 7/1981 | Hamm et al. | |
| 4,278,490 A | 7/1981 | Pistole et al. | |
| 4,284,679 A * | 8/1981 | Blad et al. | 428/218 |
| 4,321,854 A | 3/1982 | Foole et al. | |
| 4,347,287 A | 8/1982 | Lewis et al. | |
| 4,351,258 A | 9/1982 | Ray et al. | |
| 4,361,518 A | 11/1982 | Singh et al. | |
| 4,366,658 A | 1/1983 | Maistre | |
| 4,374,771 A | 2/1983 | Singh et al. | |
| 4,377,530 A | 3/1983 | Trenbeath et al. | |
| 4,381,820 A | 5/1983 | Wagner | |
| 4,396,729 A | 8/1983 | Dominquez et al. | |
| 4,397,767 A | 8/1983 | Roberts et al. | |
| 4,399,074 A | 8/1983 | Schaefer | |
| 4,414,174 A | 11/1983 | Klempner et al. | |
| 4,419,294 A | 12/1983 | Feldman et al. | |
| 4,420,570 A | 12/1983 | Dominguez | |
| 4,420,600 A | 12/1983 | Zavisza | |
| 4,429,096 A | 1/1984 | Schaefer | |
| 4,433,067 A | 2/1984 | Rice et al. | |
| 4,439,616 A | 3/1984 | Singh et al. | |
| 4,444,910 A | 4/1984 | Rice et al. | |
| 4,448,904 A | 5/1984 | Dominguez | |
| 4,465,713 A | 8/1984 | Lock et al. | |
| 4,473,217 A | 9/1984 | Hashimoto | |
| 4,474,900 A | 10/1984 | Dominguez | |
| 4,474,901 A | 10/1984 | Dominguez | |
| 4,475,323 A | 10/1984 | Schwartzberg et al. | |
| 4,487,908 A | 12/1984 | Dominguez | |
| 4,487,912 A | 12/1984 | Zimmerman et al. | |
| 4,496,706 A | 1/1985 | Chang | |
| 4,499,254 A | 2/1985 | Dominguez et al. | |
| 4,513,133 A | 4/1985 | Dominguez | |
| 4,515,933 A | 5/1985 | Chang | |
| 4,523,003 A | 6/1985 | Bezwada | |
| 4,525,568 A | 6/1985 | Chang | |
| 4,542,111 A | 9/1985 | Buran et al. | |
| 4,543,276 A | 9/1985 | Parekh | |
| 4,546,167 A | 10/1985 | Chang | |
| 4,547,265 A | 10/1985 | Forgione et al. | |
| 4,547,478 A | 10/1985 | Chang | |
| 4,548,919 A | 10/1985 | Megna | |
| 4,556,702 A | 12/1985 | Schaefer | |
| 4,568,761 A | 2/1986 | Henderson, Jr. | |
| 4,570,012 A | 2/1986 | Singh et al. | |
| 4,576,874 A | 3/1986 | Spengler et al. | |
| 4,582,887 A | 4/1986 | Dominguez | |
| 4,585,850 A | 4/1986 | Dominguez | |
| 4,588,802 A | 5/1986 | Chang | |
| 4,595,743 A | 6/1986 | Laughner et al. | |
| 4,598,103 A | 7/1986 | Chang | |
| 4,604,307 A | 8/1986 | Spreeuwers | |
| 4,607,062 A | 8/1986 | Megna | |
| 4,607,090 A | 8/1986 | Dominguez | |
| 4,619,999 A | 10/1986 | Parekh | |
| 4,649,858 A | 3/1987 | Sakai et al. | |
| 4,671,837 A | 6/1987 | Stewart | |
| 4,695,342 A | 9/1987 | Belleau et al. | |
| 4,705,814 A | 11/1987 | Grigsby, Jr. | |
| 4,713,294 A | 12/1987 | Armbruster et al. | |
| 4,716,193 A | 12/1987 | Grigsby, Jr. | |
| 4,731,428 A | 3/1988 | Waterman | |
| 4,732,919 A | 3/1988 | Grigsby, Jr. et al. | |
| 4,741,542 A | 5/1988 | Kimerly | |
| 4,742,091 A | 5/1988 | Grigsby, Jr. | |
| 4,748,192 A | 5/1988 | Smith | |
| 4,748,201 A | 5/1988 | Smith | |
| 4,754,011 A | 6/1988 | Dexter et al. | |
| 4,764,543 A | 8/1988 | Savina | |
| 4,786,341 A | 11/1988 | Kobatake et al. | |
| 4,800,104 A | 1/1989 | Cruickshank | |
| 4,806,615 A | 2/1989 | Rice et al. | |
| 4,812,278 A | 3/1989 | Natori et al. | |
| 4,842,670 A | 6/1989 | Callis et al. | |
| 4,877,705 A | 10/1989 | Polidor | |
| 4,919,388 A | 4/1990 | Koike et al. | |
| 4,940,617 A | 7/1990 | Baurmeister | |
| 5,048,441 A | 9/1991 | Quigley | |
| 5,051,226 A * | 9/1991 | Brustad et al. | 264/511 |
| 5,075,407 A | 12/1991 | Cody et al. | |
| 5,076,871 A | 12/1991 | Frye et al. | |
| 5,098,011 A | 3/1992 | Runyan | |
| 5,106,568 A | 4/1992 | Honka | |
| 5,106,935 A | 4/1992 | Grigsby, Jr. et al. | |
| 5,112,696 A | 5/1992 | Roberts | |
| 5,129,813 A | 7/1992 | Shepherd | |
| 5,134,002 A | 7/1992 | Vallier | |
| 5,171,818 A | 12/1992 | Wilson | |
| 5,200,251 A | 4/1993 | Brand | |
| 5,212,209 A | 5/1993 | Weaver et al. | |
| 5,213,747 A | 5/1993 | Lippert | |
| 5,226,997 A | 7/1993 | Vallier | |
| 5,266,137 A | 11/1993 | Hollingsworth | |
| 5,300,176 A | 4/1994 | Tanikella | |
| 5,316,462 A | 5/1994 | Seemann | |
| 5,322,665 A | 6/1994 | Bernardon et al. | |
| 5,344,685 A | 9/1994 | Casseii | |
| 5,394,933 A | 3/1995 | Takayanagi | |
| 5,463,970 A | 11/1995 | Hartlmeier et al. | |
| 5,464,797 A | 11/1995 | Yasrebi et al. | |
| 5,465,281 A | 11/1995 | Andresen et al. | |
| 5,505,035 A | 4/1996 | Lalvani | |
| 5,532,063 A | 7/1996 | Shindoh et al. | |
| 5,556,677 A | 9/1996 | Quigley et al. | |
| 5,562,586 A | 10/1996 | Hyde-Smith | |
| 5,570,742 A | 11/1996 | Reynolds et al. | |
| 5,581,588 A | 12/1996 | Andresen | |
| 5,582,861 A | 12/1996 | Schwab et al. | |
| 5,616,677 A | 4/1997 | Primeaux, II et al. | |
| 5,665,301 A | 9/1997 | Alanko | |
| 5,702,663 A | 12/1997 | Seemann | |
| 5,713,423 A | 2/1998 | Martin et al. | |
| 5,716,488 A | 2/1998 | Bryant | |
| 5,789,368 A | 8/1998 | You et al. | |
| 5,793,830 A | 8/1998 | Kim et al. | |
| 5,814,386 A | 9/1998 | Vasiliev et al. | |
| 5,817,267 A | 10/1998 | Covino et al. | |
| 5,827,567 A | 10/1998 | Molitor | |
| 5,869,141 A | 2/1999 | Blohowiak et al. | |
| 5,871,117 A | 2/1999 | Protasov et al. | |
| 5,904,972 A | 5/1999 | Tunis, III et al. | |
| 5,910,348 A | 6/1999 | Hart-Smith et al. | |
| 5,915,743 A | 6/1999 | Palma | |
| 5,921,048 A | 7/1999 | Francom et al. | |
| 5,958,166 A | 9/1999 | Walters et al. | |
| 5,962,150 A | 10/1999 | Priluck | |
| 5,962,618 A | 10/1999 | Primeaux, II et al. | |
| 5,979,508 A | 11/1999 | Cherrington | |

| | | | |
|---|---|---|---|
| 6,013,341 A | 1/2000 | Medvedev et al. | |
| 6,048,426 A | 4/2000 | Pratt | |
| 6,050,315 A * | 4/2000 | Deckers et al. | 156/433 |
| 6,076,324 A | 6/2000 | Daily et al. | |
| 6,129,119 A | 10/2000 | Schwert et al. | |
| 6,196,908 B1 | 3/2001 | Adams | |
| 6,223,421 B1 | 5/2001 | Lanque et al. | |
| 6,264,684 B1 | 7/2001 | Banas et al. | |
| 6,274,639 B1 | 8/2001 | Foreman et al. | |
| 6,290,799 B1 | 9/2001 | Deckers et al. | |
| 6,291,019 B1 | 9/2001 | Locke et al. | |
| 6,313,335 B1 | 11/2001 | Roberts et al. | |
| 6,325,958 B1 | 12/2001 | Lombardi et al. | |
| 6,369,189 B1 | 4/2002 | Naderhoff et al. | |
| 6,380,149 B2 | 4/2002 | Flynn et al. | |
| 6,403,752 B1 | 6/2002 | House et al. | |
| 6,413,642 B1 | 7/2002 | Wegner et al. | |
| 6,544,596 B2 | 4/2003 | Clemens et al. | |
| 6,613,389 B2 | 9/2003 | Li et al. | |
| 6,692,681 B1 | 2/2004 | Lunde | |
| 6,702,886 B2 | 3/2004 | Whittle et al. | |
| 6,723,271 B2 | 4/2004 | Hemphill et al. | |
| 6,723,273 B2 | 4/2004 | Johnson et al. | |
| 6,735,866 B2 | 5/2004 | Nogueroles Vines et al. | |
| 6,737,134 B2 | 5/2004 | Friedrich et al. | |
| 6,755,633 B2 | 6/2004 | Miller | |
| 6,780,472 B2 | 8/2004 | Hamrock et al. | |
| 6,797,789 B2 | 9/2004 | Davis et al. | |
| 6,828,373 B2 | 12/2004 | Artz et al. | |
| 6,840,750 B2 | 1/2005 | Thrash et al. | |
| 6,849,098 B1 | 2/2005 | Joseph | |
| 6,851,945 B2 | 2/2005 | Potter et al. | |
| 6,869,561 B2 | 3/2005 | Johnson et al. | |
| 6,964,561 B2 | 11/2005 | Louderback et al. | |
| 6,986,813 B2 | 1/2006 | Davis | |
| 7,014,809 B2 | 3/2006 | Audette | |
| 7,029,267 B2 | 4/2006 | Caron | |
| 7,132,027 B2 | 11/2006 | Jensen | |
| 7,135,518 B2 | 11/2006 | Bandou et al. | |
| 2002/0001678 A1 | 1/2002 | Locke et al. | |
| 2002/0004116 A1 | 1/2002 | Friedrich et al. | |
| 2002/0056518 A1 | 5/2002 | Shah | |
| 2002/0173575 A1 | 11/2002 | Artz et al. | |
| 2003/0109644 A1 | 6/2003 | Davis et al. | |
| 2003/0124395 A1 | 7/2003 | Whittle et al. | |
| 2003/0188821 A1 | 10/2003 | Keller et al. | |
| 2004/0055705 A1 | 3/2004 | Shutic et al. | |
| 2004/0104377 A1 | 6/2004 | Phelps et al. | |
| 2004/0127614 A1 | 7/2004 | Jian et al. | |
| 2004/0155385 A1 | 8/2004 | Johnson et al. | |
| 2004/0195713 A1 | 10/2004 | Hansel | |
| 2005/0008862 A1 | 1/2005 | Joseph et al. | |
| 2005/0086916 A1 | 4/2005 | Caron | |
| 2005/0116136 A1 | 6/2005 | Artz et al. | |
| 2005/0194716 A1 | 9/2005 | Mataya | |
| 2005/0244083 A1 | 11/2005 | McMahon | |
| 2006/0046068 A1 | 3/2006 | Barancyk et al. | |
| 2006/0093813 A1 | 5/2006 | Wang et al. | |
| 2006/0189778 A1 | 8/2006 | Smith | |
| 2007/0175031 A1 | 8/2007 | Pham et al. | |
| 2008/0083493 A1 | 4/2008 | Ridges et al. | |
| 2008/0261014 A1 | 10/2008 | McGuire et al. | |
| 2008/0286514 A1 | 11/2008 | Lam et al. | |
| 2010/0064612 A1 | 3/2010 | Wilson et al. | |
| 2010/0065717 A1 | 3/2010 | Wilson et al. | |
| 2010/0075074 A1 | 3/2010 | Wilson et al. | |

FOREIGN PATENT DOCUMENTS

| | | |
|---|---|---|
| GB | 2004835 | 9/1979 |
| GB | 2049613 | 12/1980 |
| JP | 06/031336 | 2/1994 |
| JP | 08/081128 | 3/1996 |
| JP | 08-151454 | 6/1996 |
| JP | 08/259116 | 10/1996 |
| JP | 09-239926 | 9/1997 |
| JP | 11/244940 | 9/1999 |
| JP | 2003103343 | 4/2003 |
| JP | 2006002219 | 1/2006 |
| KR | 1019890008010 | 7/1989 |
| WO | WO99/65674 | 6/1999 |
| WO | WO03029355 | 4/2003 |

OTHER PUBLICATIONS

Composite Tower Solutions, 2 pages.
Fiber Innovations: Resin Transfer Modling (RTM), VaRTM, Composite Structures, 1 page.
Carbon C-Thru Road Frame, Jan. 2008, pp. 2-10, www.bmeres.com/c-thruframe.htm.
Scientific and Technical Information, Open-Lattice Composite Design Strengthens Structures, Spinoff 2007, 3 pages.
Titus Cycles—IsoGrid Technology, 1 page.
Wellington Bomber, The Vickers Armstron Wellington, The Mighty Wimpy, 2 pages.
3TEX, Inc. 2007, Research to Reliability to Realtiy, 3-Dimension Reinforcement.
Vasiliev et al., "Anisogrid composite lattice structures for spacecraft and aircraft applications" Composite structures, ISSN 0263-8223, International Conference on COmposite Materials N 15 Durban, Jun. 27, 2005.
An Hou, Buckling Strength of Composite Lattice Structures, 1997, 3 pages.
Carbon Fiber Machining—manual and computer controlled production—PCT Power & Composite Technologies Inc., 1 page.
Millenium Tower, Toyko—SkyscraperPage.com, 2008, 2 pages.
Greenside Place Link Bridge, Edinburgh. Case Study. htt://www.lusas.com/case/bridge/greenside.html. As accessed on Apr. 27, 2010. pp. 1-3.
Steven M. Hansen. "Influence of Consolidation and Interweaving on Compression Behavior of Isotruss". Thesis submitted to faculty at BYU. Apr. 2004.
Sarita Lee Kesler. "Consolidation and Interweaving of Composite Members by a Continuous Manufacturing". Thesis submitted to the faculty at BYU. Dec. 2006.
U.S. Appl. No. 12/542,555, filed Aug. 17, 2009; Erich A. Wilson; office action issued Oct. 27, 2011.
U.S. Appl. No. 12/542,613, filed Aug. 17, 2009; Erich A. Wilson; office action issued Dec. 9, 2011.
Ridges; U.S. Appl. No. 12/008,400, filed Jan. 9, 2008 Published as 2008/0182054 on Jul. 31, 2008.
www.mssu.edu.seg-vm/introduction_to-geophysical_prospecting.html; Society of Exporation Geophysicists; Virtual Geoscience Center; Sep. 7, 2006; 8 pages.
www.engineeredpolymers.net/products.php?category=Polyureas; Engineered Polymers International, LLC; Sep. 1, 2006; 7 pages.
Bayer; BaySystems North America; Evercoat 900 Spray Polyurea Coating; Jan. 1, 2006; 7 pages.
Tuboscope, The Original Power Drill Pipe Coating, TK 34P, Feb. 1, 2001; 2 pages.
Pourciau; Case History: Internally Coated Completion Workstring Successes; SPE Annual Technical Conference and Exhibition; Sep. 29-Oct. 2 in Texas; Copyright 2002; Society of Petroleum Engineers Inc. Abstract.
Madison Chemcial Industires, Inc.; Corroclad 2000; Coroclad 2000 HT and Corropipe II TX-15, revised Jul. 2007; vol. 3; 6 pages.
www.madisonchemical.com/product_pages/corropipe_2_ultraliner.htm; Madison Chemical CorroPipe II UltraLiner—Pipe Lining System; Copyright 2005; 2 pages.
Engineered Polymers International, LLC, EP JS Joint Sealant (JS), Powered by Reactamine Technology; Oct. 30, 2006; 1 page Valspar Composites; Mold Making and Repair; www.valsparcomposites.com; Revised Feb. 12, 2006; pp. 1-20 Hawkeye Industries Inc.; Application Guide, Repair Application: Composite Molds; pp. 1-2.
Airtech Advanced Materials Group; Application Instructions for Restoring Tool Face or Vacuum Integrity to Composite or Metal Molds; Mar. 10, 1997; p. 27; Huntington Beach, California.
Kipp; U.S. Appl. No. 11/854,322, filed Sep. 12, 2007 Published as 2008/0135296 on Jun. 12, 2008.

Ridges; U.S. Appl. No. 11/546,017, filed Oct. 10, 2006 Published as 2008/0083493 on Apr. 10, 2008.
Kipp; U.S. Appl. No. 12/151,733, filed May 7, 2008.
Kipp; U.S. Appl. No. 12/647,130, filed Jul. 29, 2010 Published as 2010/0186889 on Jul. 29, 2010.
Kipp; U.S. Appl. No. 11/418,850, filed May 5, 2006 Published as 2006/0266472 on Nov. 30, 2006.
Kipp et al; U.S. Appl. No. 11/799,750, filed May 1, 2007 Published as 2008/0008836 on Jan. 10, 2008.
Kipp et al.; U.S. Appl. No. 11/975,009, filed Oct. 16, 2007 Published as 2008/0106007 on May 8, 2008.

Ridges et al; U.S. Appl. No. 11/999,388; filed Dec. 4, 2007 Published as 2008/0131716 on Jun. 5, 2008.
Ridges et al; U.S. Appl. No. 11/975,226; filed Oct. 17, 2007 Published as 2008/0105997 on May 8, 2008.
PCT Application PCT/US2011/036694; filed May 16, 2011; Erich Wilson; international search report mailed Feb. 17, 2012.
U.S. Appl. No. 12/542,555, filed Aug. 17, 2009; Erich A. Wilson; notice of allowance dated Sep. 18, 2012.

* cited by examiner

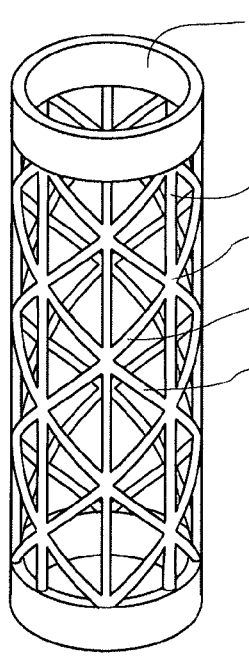
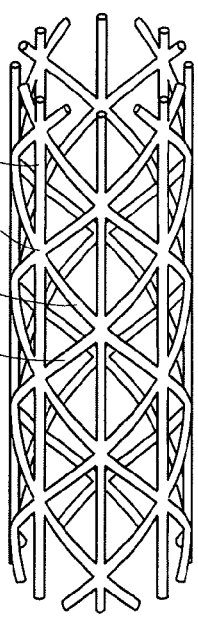
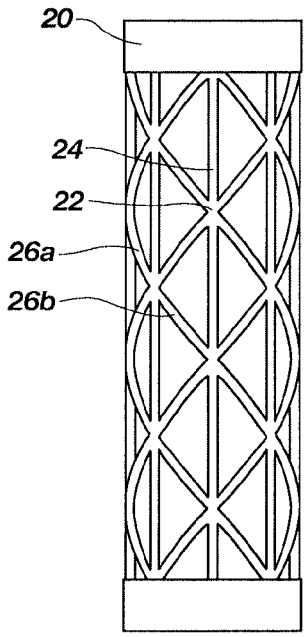
*FIG. 1A*      *FIG. 1B*      *FIG. 1C*
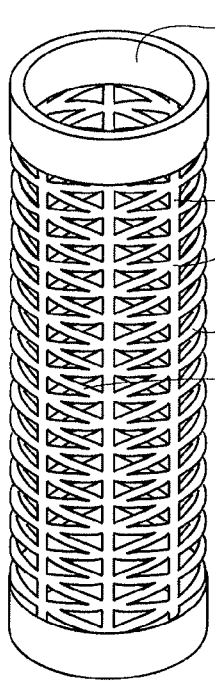
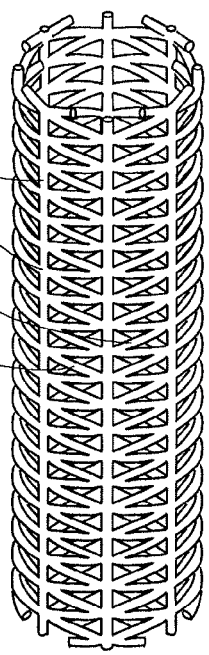
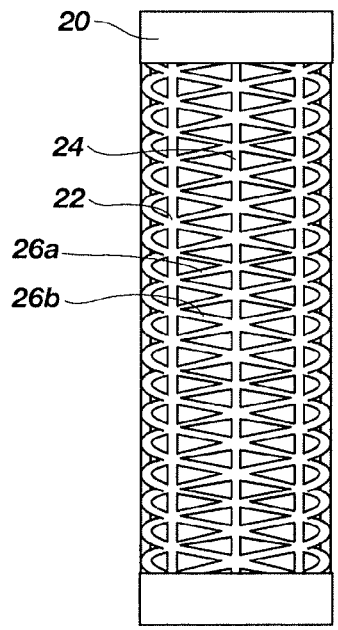
*FIG. 2A*      *FIG. 2B*      *FIG. 2C*

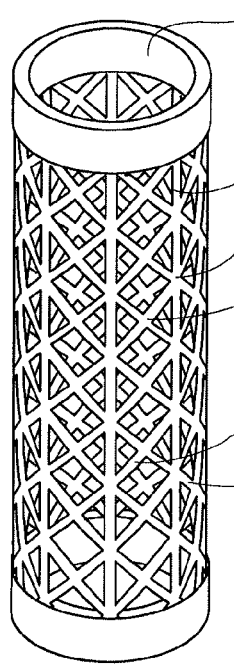
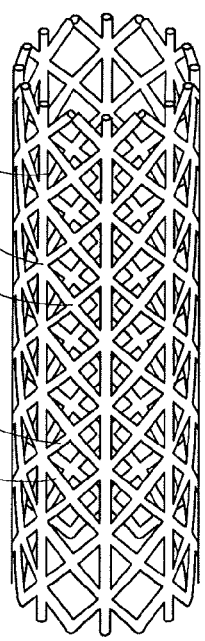
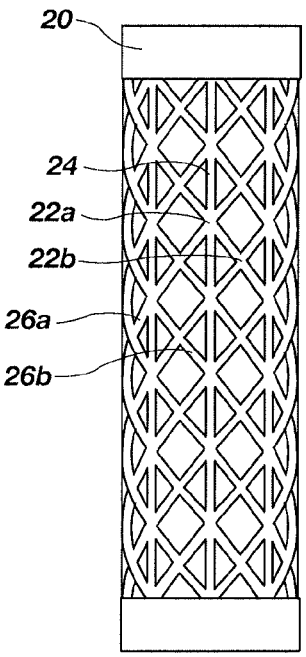
FIG. 3A              FIG. 3B              FIG. 3C
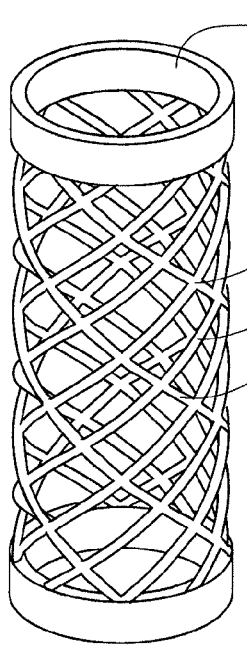
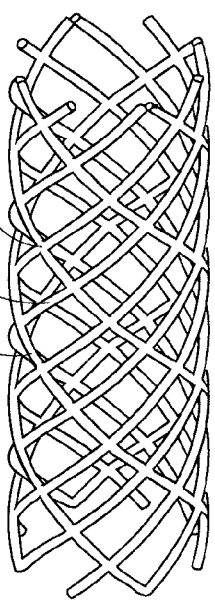
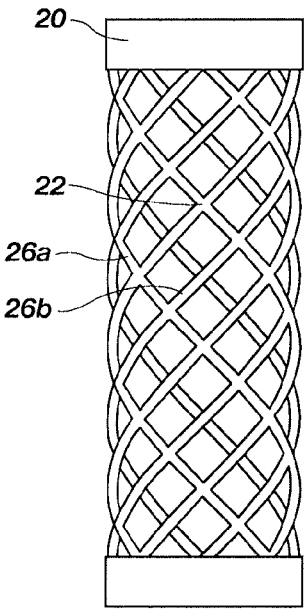
FIG. 4A              FIG. 4B              FIG. 4C

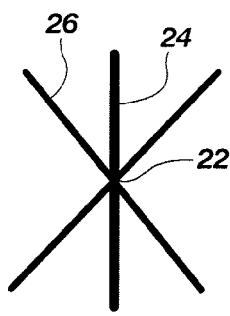
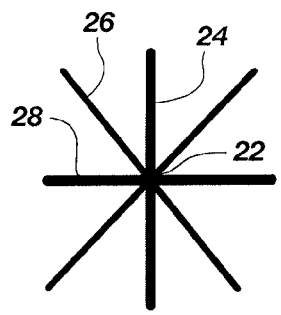
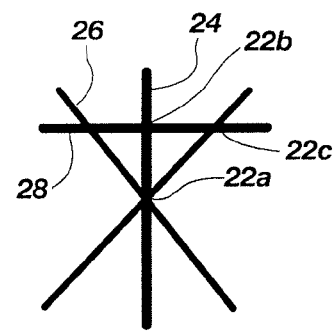
FIG. 6A　　　　FIG. 6B　　　　FIG. 6C
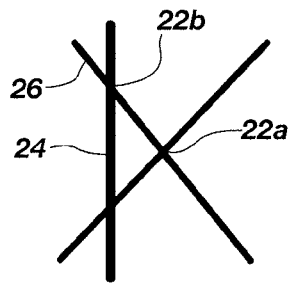
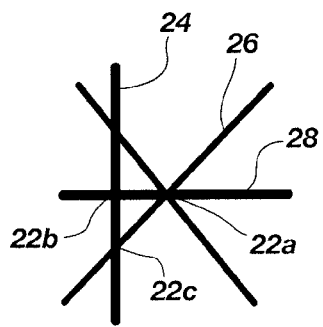
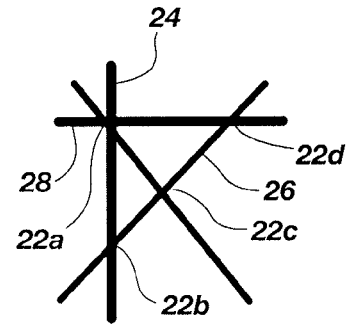
FIG. 6D　　　　FIG. 6E　　　　FIG. 6F
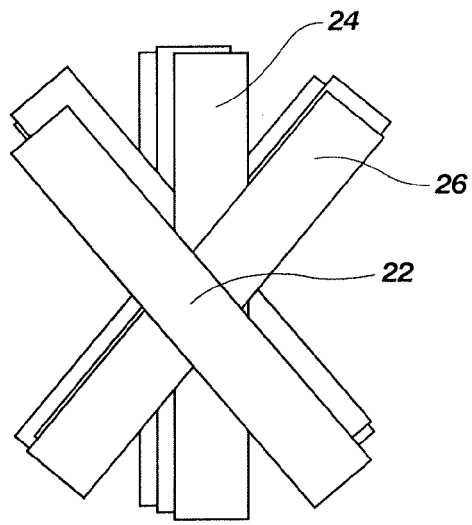
FIG. 7

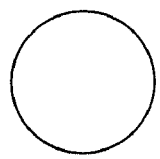
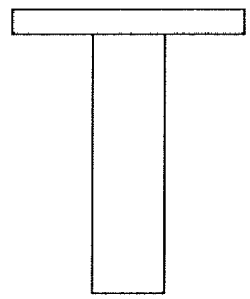
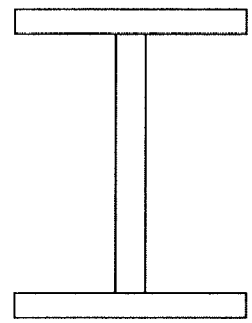
*FIG. 12A*  *FIG. 12B*  *FIG. 12C*  *FIG. 12D*
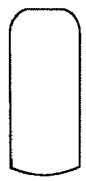
*FIG. 13A*  *FIG. 13B*  *FIG. 13C*
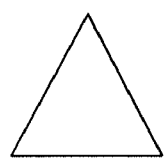
*FIG. 13D*  *FIG. 13E*  *FIG. 13F*

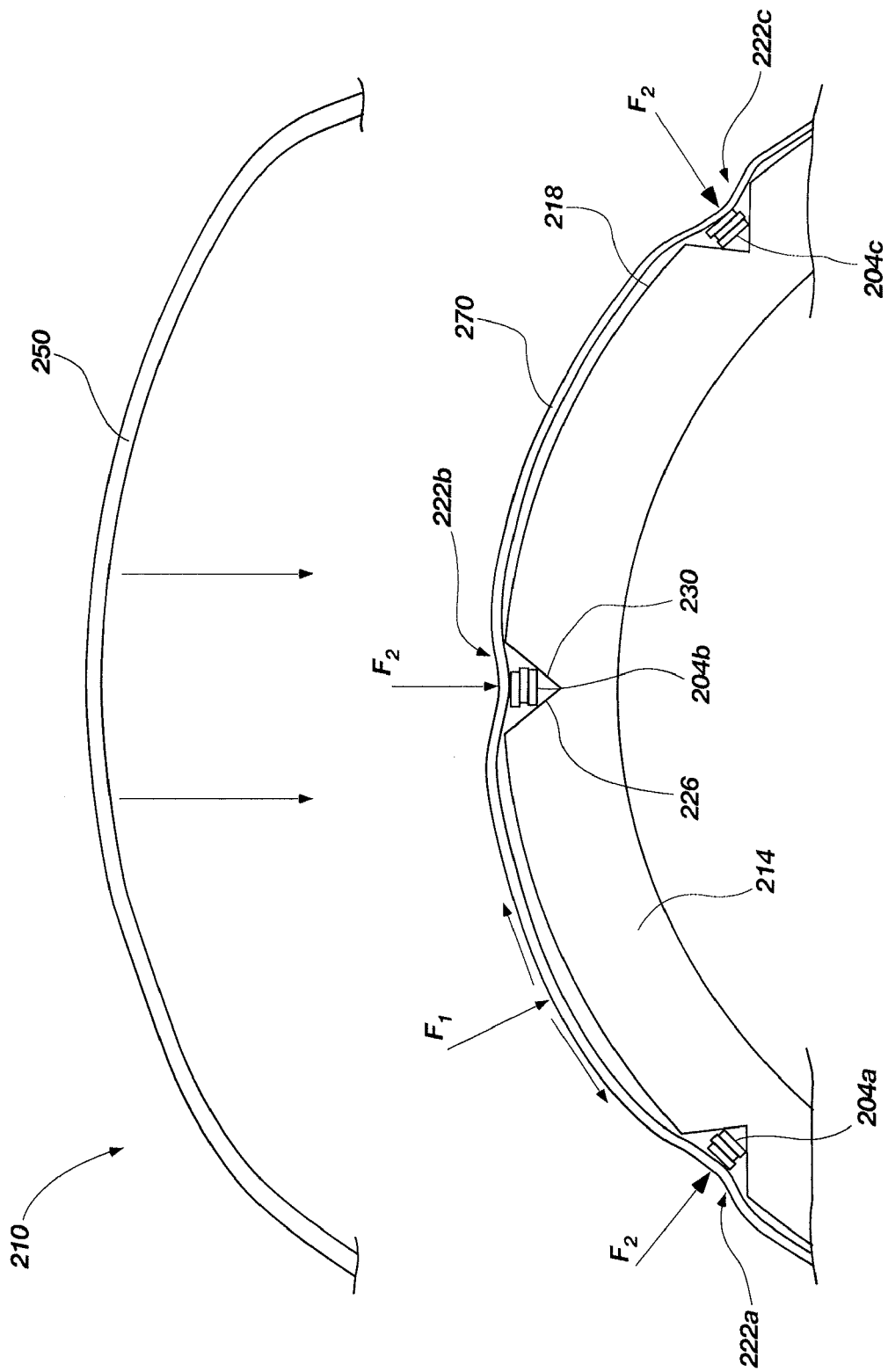

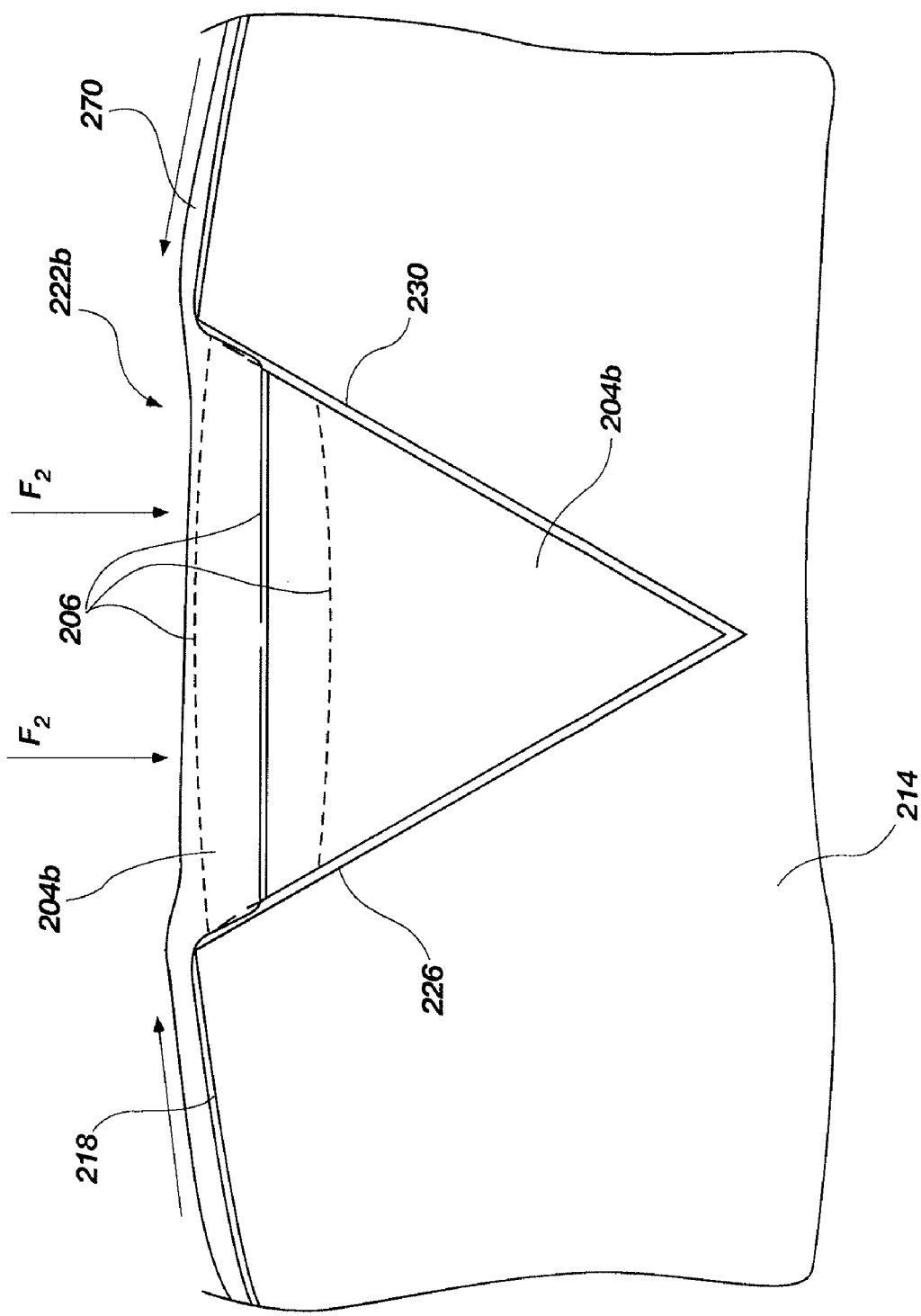

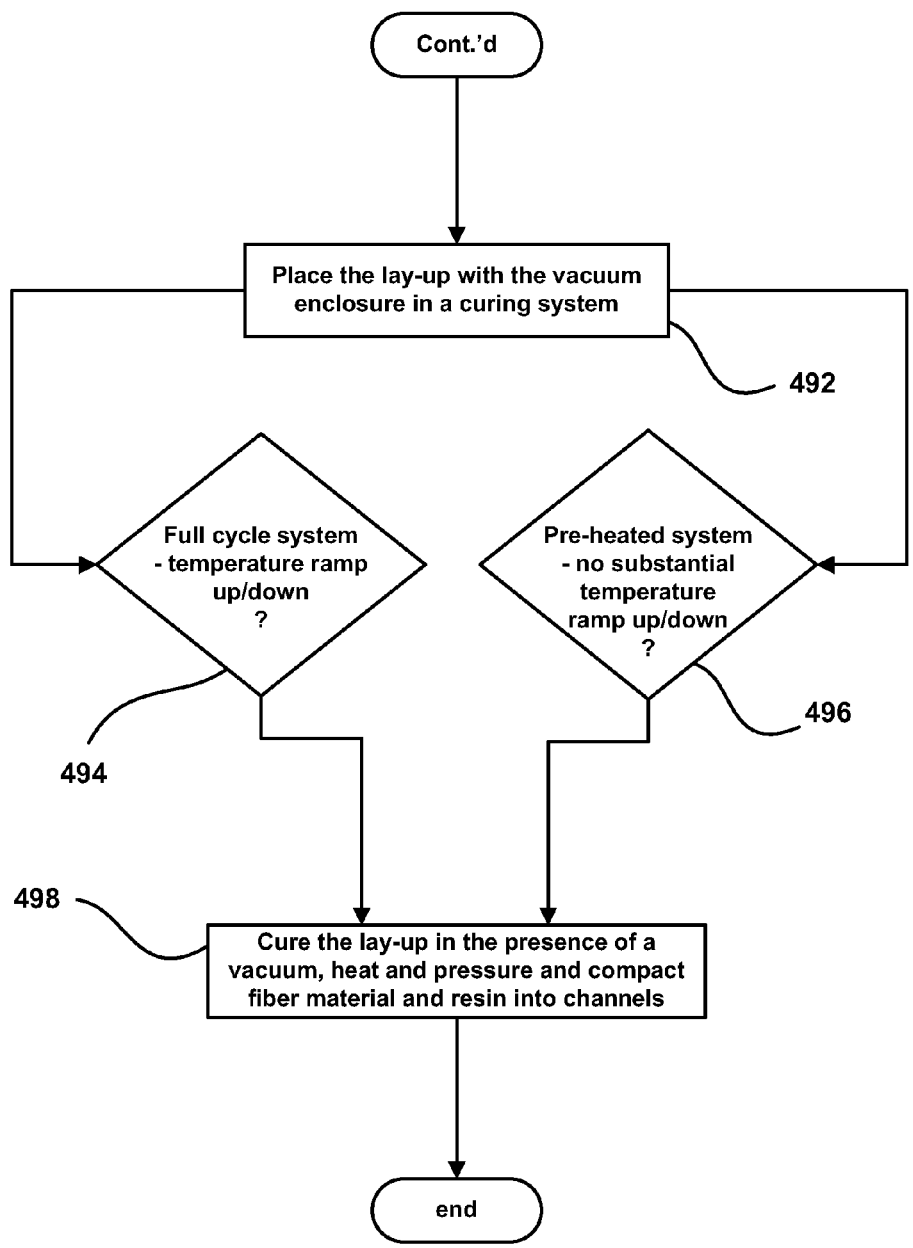
FIG. 20 (cont.'d)

METHOD AND SYSTEM FOR FORMING COMPOSITE GEOMETRIC SUPPORT STRUCTURES

RELATED APPLICATIONS

This application claims the benefit of U.S. Provisional Application No. 61/089,124, filed Aug. 15, 2008, and entitled, "Three-Dimensional Geo-Strut Structure and Method of Manufacture," which is incorporated by reference in its entirety herein.

FIELD OF THE INVENTION

The present invention relates generally to complex three-dimensional geometric lattice support structures that have enhanced load bearing capacity per unit weight, and that are formed from composite materials (e.g., lattice structures formed from carbon or other fiber reinforcements and resin (e.g., polymer matrix) constituents). More particularly, the present invention relates to the methods and systems used in the formation of such structures.

BACKGROUND OF THE INVENTION AND RELATED ART

Development of improved support structures in the fields of civil, mechanical and aerospace design is a constant and ongoing effort. One primary focus of these efforts is in producing efficient support structures that exhibit high strength properties while being low in weight. In other words, a beneficially efficient support structure will comprise a relatively high force to weight ratio.

In the field of composite lattice support structures, a primary issue concerning such structures relates to the difficulty in the manufacturing methods used to form the individual support members making up the lattice structure.

BRIEF DESCRIPTION OF THE DRAWINGS

The present invention will become more fully apparent from the following description and appended claims, taken in conjunction with the accompanying drawings. Understanding that these drawings merely depict exemplary embodiments of the present invention they are, therefore, not to be considered limiting of its scope. It will be readily appreciated that the components of the present invention, as generally described and illustrated in the figures herein, could be arranged and designed in a wide variety of different configurations. Nonetheless, the invention will be described and explained with additional specificity and detail through the use of the accompanying drawings in which:

FIGS. 1A-1C depict exemplary embodiments of lattice support structures in accordance with embodiments of the present disclosure;

FIGS. 2A-2C depict alternative exemplary embodiments of lattice support structures in accordance with embodiments of the present disclosure;

FIGS. 3A-3C depict alternative exemplary embodiments of lattice support structures in accordance with embodiments of the present disclosure;

FIGS. 4A-4C depict alternative exemplary embodiments of lattice support structures in accordance with embodiments of the present disclosure;

FIGS. 6A-6F depict various arrangements of cross supports and various node configurations in accordance with embodiments of the present disclosure;

FIG. 7 depicts a multi-layered node configuration prior to fusion and/or consolidation in accordance with embodiments of the present disclosure, where each cross support includes multiple layers and the layers are stacked with other cross support material from different cross supports therebetween;

FIGS. 12A-12D depict alternative exemplary embodiments of cross-sectional geometries of individual cross supports;

FIGS. 13A-13F depict still further alternative exemplary embodiments of cross-sectional geometries of individual cross supports;

FIG. 16A depicts a partial cross-sectional view of a system used to fabricate a lattice support structure in accordance with another exemplary embodiment of the present invention;

FIG. 16B depicts a detailed partial cross-sectional view of the system of FIG. 16A;

DETAILED DESCRIPTION OF EXEMPLARY EMBODIMENTS

Figure 5:
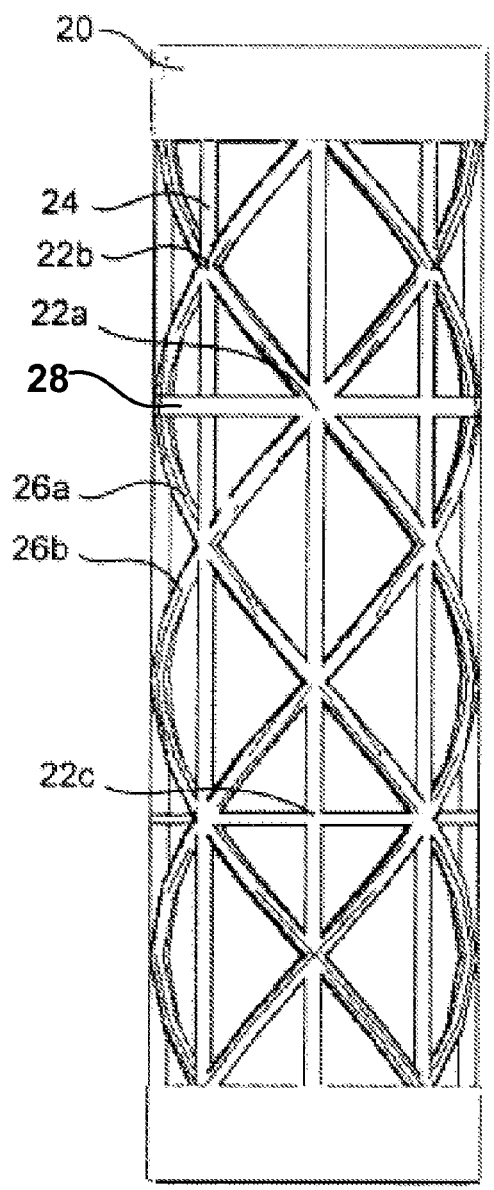
FIG. 5 depicts an alternative exemplary embodiment of another lattice support structure in accordance with embodiments of the present disclosure.

The following detailed description of exemplary embodiments of the invention makes reference to the accompanying drawings, which form a part hereof and in which are shown, by way of illustration, exemplary embodiments in which the invention may be practiced. While these exemplary embodiments are described in sufficient detail to enable those skilled in the art to practice the invention, it should be understood that other embodiments may be realized and that various changes to the invention may be made without departing from the spirit and scope of the present invention. Thus, the following more detailed description of the embodiments of the present invention is not intended to limit the scope of the invention, as claimed, but is presented for purposes of illustration only to describe the features and characteristics of the present invention, and to sufficiently enable one skilled in the art to practice the invention. Accordingly, the scope of the present invention is to be defined solely by the appended claims.

The following detailed description and exemplary embodiments of the invention will be best understood by reference to the accompanying drawings, wherein the elements and features of the invention are designated by numerals throughout.

At the outset, the term "fiber-based composite material" shall be understood to mean a material comprised of carbon or other fiber (e.g., a carbon or glass fiber filament) and resin (e.g., polymer matrix) constituents.

When referring to a "multi-layered" node, what is meant is that the cross supports are not merely stacked on top of one another, but rather, a first individual cross support has multiple layers with one or more layer(s) of material from other cross supports therebetween. Thus, in order to be "multi-layered, there must be at least one cross support or layer of at least one cross support that is between at least two layers of another cross support. Typically, however, each cross support of the node is layered with other cross support layers therebetween (as shown hereinafter in FIG. 7). The term "multi-layered" node may also be described as one or more selective individual fiber filaments of one cross support intersecting and being layered with one or more individual selective fiber filaments of at least one other cross support.

The term "preform" shall be understood to mean the green, uncured composite lay-up comprising the fiber material and resin composite as situated about the rigid mold, and that has undergone preliminary shaping but is not yet in its final consolidated or cured form.

The present invention provides methods and systems for forming composite lattice support structures. Examples of other composite articles and methods for the fabrication thereof can be found in Applicants' copending U.S. Patent Applications filed Aug. 17, 2009 under Ser. Nos. 12/542,442, and 12/542,555, each of which is incorporated herein by reference. Examples of rigid molds, such as rigid mandrels, for use in the fabrication of fiber-based composite articles can be found in Applicants' copending U.S. Patent Application filed Aug. 17, 2009 under Ser. No. 12/542,613, which is incorporated herein by reference. Examples of curing systems for use in forming fiber-based composite articles can be found in Applicant's copending U.S. Patent Application filed Aug. 17, 2009 under 61/234,553, which is incorporated herein by reference.

The present invention describes a method for forming a composite lattice support structure. The method can comprise forming first and second cross supports where the first and second cross supports intersect at one or more locations, each being formed from having a fiber-based composite material. The method can also comprise forming one or more multi-layered nodes where the first and second cross supports intersect, with one or more selective individual fiber filaments of the first cross support intersecting and being layered with one or more individual selective fiber filaments of the second cross support to define the multi-layered nodes. The first and second cross supports, with the multi-layered nodes, define a lattice support structure having a seamless three-dimensional geometry about a centerline. The method can also include forming multiple additional cross supports, or a plurality of cross supports, these intersecting with one another to define or form a plurality of primary and/or secondary multi-layered nodes.

The present invention also describes a method for forming a composite lattice support structure having a plurality of cross supports intersecting one another to form a plurality of multi-layered nodes. The method can comprise obtaining a rigid mold having a plurality of rigid channels, at least some of the plurality of rigid channels intersecting at strategic locations. The method can also comprise laying up a fiber material, in the presence of a resin, within the channels, and then consolidating the lay-up in the presence of heat and pressure to form a plurality of composite cross supports having a pre-determined lateral cross-sectional area controlled by a cross-sectional area of the channels, and that intersect to form a plurality of nodes. The channels are intended to contain the consolidated lay-up and facilitate the formation of the cross supports. Additionally, at least some of the cross supports can be curved from node to node to provide non-linear path loading along the cross supports.

The present invention further describes a method for preparing a green (or uncured) composite three-dimensional lattice lay up for use in forming a seamless three-dimensional geometric support structure. The method can comprise obtaining a rigid mold having one or more channels associated therewith, obtaining a fiber material, depositing the fiber material, in the presence of a resin, onto the rigid mold within the channels, causing at least some of the fiber materials to extend in a three-dimensional orientation about a centerline, and then causing one or more of the fiber materials to intersect to and to layer to form a lattice structure, and a plurality of multi-layered nodes. This method may also include causing additional fiber materials to extend laterally, circumferentially or axially with respect to the centerline, which additional fiber materials may be caused to intersect and be layered with any other present fiber materials.

The present invention further describes a system for forming complex three-dimensional composite lattice support structures, the system comprising a rigid mold having a plurality of rigid channels, at least some of the plurality of rigid channels intersecting at strategic locations; a lay-up of fiber material, in the presence of a resin, within the channels, the fiber material comprising fiber filaments that are layered with one another and that intersect at the strategic locations; and a curing system for consolidating the lay-up to form a plurality of cross supports and multi-layered nodes.

The present invention complex composite lattice support structure provides several significant advantages over prior related lattice support structures, depending upon its configuration and makeup, some of which are recited here and throughout the following more detailed description. For instance, the lattice support structure of the present invention provides a three-dimensional structure with enhanced load bearing capacity per unit mass. It provides a structural unit whose members do not geometrically protrude from the general body of the unit. It provides a structural unit for which the production tooling and methods of fabricating are efficient and relatively inexpensive, thus lending the support structure to mass production. It provides a structural unit that is geometrically flexible to conform to designs such as cylinders, ellipses, airfoils, and other circumferentially closed geometries. It provides a structural member capable of withstanding torsional loading where the unit can be specifically designed for torsional loads through the number and density of cross supports. It provides a structural member capable of withstanding cyclical loading. Among other applications, It provides a structural member suitable for mechanical and aerospace applications, such as structural aircraft components or drive shafts where high strength and low weight are needed.

Each of the above-recited advantages will be apparent in light of the detailed description set forth below, with reference to the accompanying drawings. These advantages are not meant to be limiting in any way. Indeed, one skilled in the art will appreciate that other advantages may be realized, other than those specifically recited herein, upon practicing the present invention. In addition, some or all of these advantages, as well as others not recited, may be applicable or not depending upon the particular lattice support structure and intended application.

With specific reference to FIGS. 1A, 1B, and 1C, one embodiment of a lattice support structure is shown. FIG. 1A and FIG. 1C are identical, showing different views of the same structure. FIG. 1B is identical to FIG. 1A, except that it does not include optional support collars 20 on each end of the lattice support structure. These lattice support structures each comprise a plurality of fiber-based cross supports intersecting one another to form several multi-layered nodes 22. It is noted that there are eight longitudinal cross supports 24 and eight helical cross supports 26a, 26b (four twisting clockwise 26a from top to bottom and four twisting counterclockwise 26b from top to bottom). Nodes are formed in this embodiment where three cross supports (one longitudinal cross support, one clockwise helical cross support, and one counterclockwise helical cross support) intersect. The helical cross supports form curved node-to-node cross support segments. This structure also demonstrates 4 helical cross supports taken at a high pitch, 1 turn per 7 inches, with 4 counter wrapped helical cross supports of equal pitch combined with longitudinal cross supports, coupled at a plurality of multi-layered nodes where the ends have been consolidated by a collar. It is noted that this structure profile, including number and direction of turns, number and position of various cross supports, etc., is merely exemplary, and can be modified slightly or significantly in accordance with embodiments of the present disclosure.

With specific reference to FIGS. 2A, 2B, and 2C, another embodiment of a lattice support structure is shown. FIG. 2A and FIG. 2C are identical, showing different views of the same structure. FIG. 2B is identical to FIG. 2A, except that it does not include optional support collars 20 on each end of the lattice support structure. These lattice support structures each comprise a plurality of fiber-based cross supports intersecting one another to form several multi-layered nodes 22. It is noted that there are eight longitudinal cross supports 24 and eight helical cross supports 26a, 26b (four twisting clockwise 26a from top to bottom and four twisting counterclockwise 26b from top to bottom). Nodes are formed in this embodiment where three cross supports (one longitudinal cross support, one clockwise helical cross support, and one counterclockwise helical cross support) intersect. The helical cross supports form curved node-to-node cross support segments. It is noted that the primary difference between the structures shown in FIGS. 1A-1C and the structures shown in FIGS. 2A-2C is the increased frequency of twists for the helical lattice support structures in FIGS. 2A-2C. This structure also demonstrates 4 helical cross supports taken at a low pitch, 5 turns per 7 inches, with 4 counter wrapped helical cross supports of equal pitch combined with longitudinal cross supports, coupled at a plurality of multi-layered nodes where the ends have been consolidated by a collar.

With specific reference to FIGS. 3A, 3B, and 3C, another embodiment of a lattice support structure is shown. FIG. 3A and FIG. 3C are identical, showing different views of the same structure. FIG. 3B is identical to FIG. 3A, except that it does not include optional support collars 20 on each end of the lattice support structure. These lattice support structures each comprise a plurality of fiber-based cross supports intersecting one another to form several multi-layered nodes 22a, 22b. Again, it is noted that there are eight longitudinal cross supports 24. However, in this embodiment, there are sixteen (16) helical cross supports 26a, 26b (eight twisting clockwise 26a from top to bottom and eight twisting counterclockwise 26b from top to bottom). This embodiment demonstrates that the density of cross supports (in this case helical cross supports) may be selectively varied between different support structures, depending upon the loading or other performance requirements the lattice support structure is intended to provide. For instance, when compared with the support structure embodiment of FIGS. 1A, 1B and 1C, having a total of eight cross supports, the support structure of this embodiment illustrates a greater number of helical cross supports.

Also, in this embodiment, two different types of multi-layered nodes are formed. First, multi-layered nodes 22a are formed where three cross supports (one longitudinal cross support, one clockwise helical cross support, and one counterclockwise helical cross support) intersect. Multi-layered nodes 22b are also formed where two helical cross supports (one clockwise helical and one counterclockwise helical) intersect without a longitudinal cross support. This structure also demonstrates 8 helical cross supports taken at a high pitch, 1 turn per 7 inches, with 8 counter wrapped helical cross supports of equal pitch combined with longitudinal cross supports, coupled at a plurality of multi-layered nodes where the ends have been consolidated by a collar. It is also noted that additional multi-layered nodes are present that do not include longitudinal cross supports.

With specific reference to FIGS. 4A, 4B, and 4C, another embodiment of a lattice support structure is shown. FIG. 4A and FIG. 4C are identical, showing different views of the same structure. FIG. 4B is identical to FIG. 4A, except that it does not include optional support collars 20 on each end of the lattice support structure. These lattice support structures each comprise a plurality of fiber-based cross supports intersecting one another to form several multi-layered nodes 22. In this embodiment, there are no longitudinal cross supports. Also in this embodiment, there are twelve (12) helical cross supports 26a, 26b (four twisting clockwise 26a from top to bottom and eight twisting counterclockwise 26b from top to bottom). This embodiment thus also demonstrates the ability to design for unidirectional torsion and other loads through varying the number of members in the clockwise direction from those in the counterclockwise direction, or vice versa. This embodiment also demonstrates the ability to space cross supports as needed, and that not all cross supports have to be spaced an equidistance from one another. Nodes 22 are formed where two helical cross supports (one clockwise helical cross support and one counterclockwise helical cross support) intersect without a longitudinal cross support.

With specific reference to FIG. 5, another embodiment of a lattice support structure is shown. In this embodiment, not only are longitudinal cross supports 24 and helical cross supports 26 provided, but circumferential or lateral cross supports 28 are also provided. Again, these lattice support structures each comprise a plurality of fiber-based cross supports intersecting one another to form several multi-layered nodes 22a, 22b, 22c. In this embodiment, there are eight helical cross supports 26 and eight longitudinal cross supports 24, as described previously in FIGS. 1A-1C. However, there are also two additional circumferential cross supports 28. Thus, in this embodiment, there are three different multi-layered node configurations. First, multi-layered nodes 22a are formed where four cross supports (one longitudinal cross support, one circumferential cross support, one clockwise helical cross support from top to bottom, and one counterclockwise helical cross support from top to bottom) intersect. Multi-layered nodes 22b are also formed where three cross supports (one longitudinal cross support, one clockwise helical cross support from top to bottom, and one counterclockwise helical cross support from top to bottom) intersect. Next, multi-layered nodes 22c are formed where two cross supports (one longitudinal cross support and one circumferential cross support) intersect.

It is noted that FIGS. 1A to FIG. 5 are provided for exemplary purposes only, as many other structures can also be formed in accordance with embodiments of the present disclosure. For example, from structure to structure, twist pitch can be modified for helical cross supports, longitudinal cross supports added symmetrically or asymmetrically, circumferential cross supports can be added uniformly or asymmetrically, node locations and/or number of cross supports can be varied, as can the overall geometry of the resulting part including diameter, length and the body-axis path to include constant, linear and non-linear resulting shapes as well as the radial path to create circular, triangular, square and other polyhedral cross-sectional shapes with or without standard rounding and filleting of the corners, etc. In other words, the present invention lattice supports structures are highly customizable, and may be constructed or formed in accordance with a number of design parameters or variables. They can be tailored to a specific need. For example, if the weight of a lattice support structure needs to be kept to a minimum, then the lattice support structure may be designed and formed accordingly to provide only those cross supports that are needed, with these being oriented, spaced and configured as optimally as possible. Obviously, the converse is true with support structures capable of being designed accordingly, such as where weight requirements are secondary to any load bearing requirements. In essence, several design variables exist that include, but are not limited to pitch angle, number of helical cross supports, number of longitudinal and lateral cross supports, multiple pitch angles, spacing of cross supports, partial length cross supports, selective cross support cross-sectional areas, amount of tow wrap, type of tow, etc.

In accordance with this, FIGS. 6A-6F provide exemplary relative arrangements for helical, longitudinal, and circumferential cross supports that can be used in forming lattice support structures. Various node placements are also shown in these FIGS. FIG. 6A depicts a longitudinal cross support 24 and helical cross supports 26, forming a multi-layered node 22 at the intersection of all three cross supports. This is similar to that shown in FIGS. 1A-3C and 5. FIG. 6B depicts a longitudinal cross support 24, helical cross supports 26, and a circumferential cross support 28 forming a multi-layered node 22 at the intersection of all four cross supports. FIG. 6C depicts a longitudinal cross support 24, helical cross supports 26, and a circumferential cross support 28 forming three different types of multi-layered nodes 22a, 22b, 22c. FIG. 6D depicts a longitudinal cross support 24 and helical cross supports 26 forming two different types of multi-layered nodes 22a, 22b. FIG. 6E depicts a longitudinal cross support 24, helical cross supports 26, and a circumferential cross support 28 forming three different types of multi-layered nodes 22a, 22b, 22c. It is noted that this arrangement provides two multi-layered nodes that are similar to FIG. 6C (22a, 22b) and one that is different (22c). Specifically, multi-layered node 22c in FIG. 6C comprises a circumferential cross support and a helical cross support, whereas multi-layered node 22c in FIG. 6E comprises a longitudinal cross support and a helical cross support, thus illustrating the flexibility of design of the lattice support structures of the present disclosure. FIG. 6F depicts a longitudinal cross support 24, helical cross supports 26, and a circumferential cross support 28 forming four different types of multi-layered nodes 22a, 22b, 22c, 22d.

Turning to FIG. 7, more detail is provided with respect to forming multi-layered nodes in accordance with embodiments of the present disclosure. Specifically, for illustrative purposes only, the multi-layered node 22 shown in FIG. 6A is shown in more detail prior to heat and pressure fusion or consolidation. As can be seen in this embodiment, a longitudinal cross support 24 and two helical cross supports 26 are shown. Specifically, each cross support comprises multiple layers, and at the multi-layered node, each layer is separated from a previously applied layer by at least one other cross support layer. In this manner, a multi-layered node is formed that can be cured in accordance with embodiment of the present disclosure. Each layer of each cross support comprises a plurality of fiber filaments.

Generally speaking, in one embodiment, the curing process comprises applying 90-150 psi nitrogen gas at 250-350° F. for a soak period of about 10 to 240 minutes depending on the size of the part and its coinciding tooling. In this embodiment, the cross supports with layered and interleaved nodes can be applied to a solid mandrel and wrapped with a membrane or bag. Once in place, the pressure from the ambient curing gas provides an even press through the bag on the entire part, thus curing and consolidating the multi-layered nodes. The method for forming the lattice support structures, including the curing or consolidation steps, is described in greater detail below.

Figure 8:
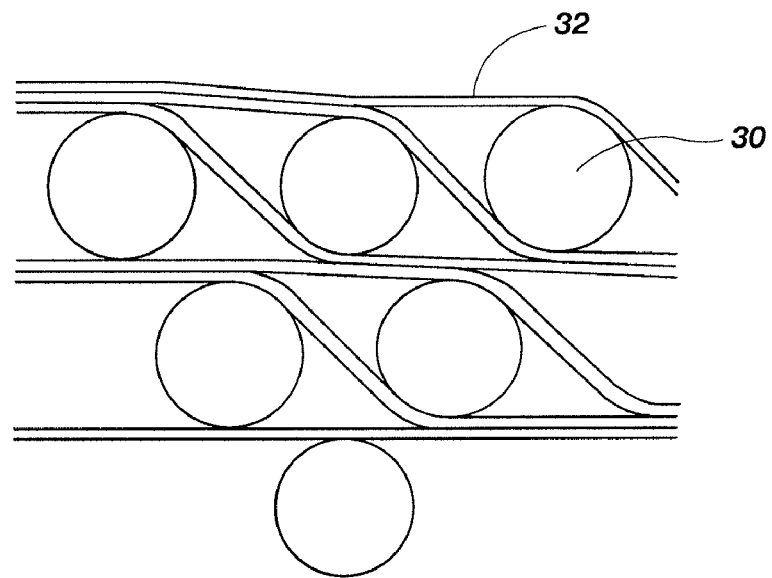
FIG. 8 depicts node layering in cross section in accordance with one embodiment of the present disclosure.
Figure 9:
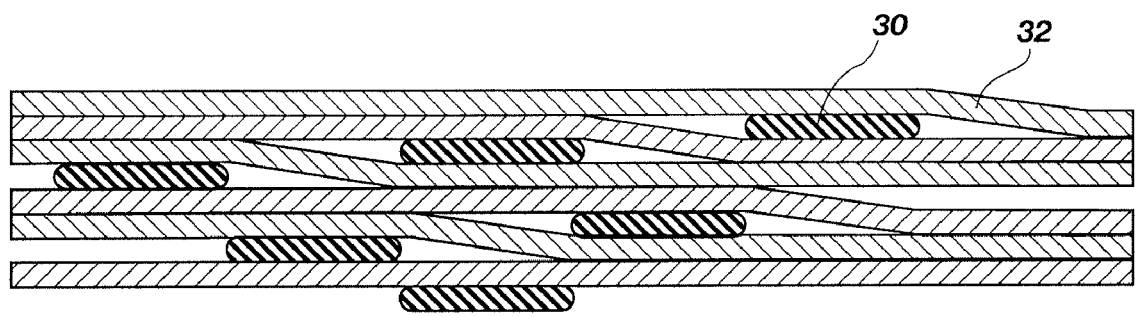
FIG. 9 depicts node layering in cross section in accordance with another embodiment of the present disclosure.

FIGS. 8 and 9 depict schematic representations of possible multi-layered node structures. Specifically, FIG. 8 depicts layering using tow material of low fiber count and what a nodal cross-section might appear to be like before consolidation; and FIG. 9 depicts what the layering would appear like after consolidation. It is noted that the fiber of high fiber-count tow or tape products may appear like FIG. 9 prior to consolidation as well, and after consolidation, the node would appear even more flattened in shape. In these FIGS., it is assumed that six layers of tow or tape are wrapped to demonstrate the leaving of layers in the nodes. In each of these two figures, the cross supports shown on end (along the Z-axis) in cross-section 30 can be assumed to be members which continue into and out of the respective FIG. The fiber materials 32 crossing them (along the X- and Y-axis) represent a single cross-support members, and collectively, these cross supports form nodes of the shape similar to 22b, 22c and 22d in FIGS. 6E and 6F. In these illustrations, the helical cross support is approaching from the left side. Were there to be an additional helical member wrapped in the opposite direction, it would look to be the mirror image of the one shown and approach from the right side of the figures.

Figure 10:
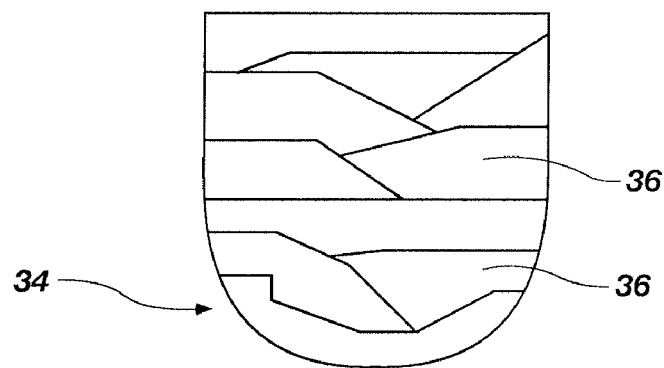
FIG. 10, depicts a cutaway portion of an exemplary consolidated node in accordance with embodiments of the present disclosure.

FIG. 10 sets forth a cutaway cross-section of a multi-layered node after curing and consolidation of the layered material. Note the cross-sectional area of the member is set into a half-pipe geometry 34 (as consolidated and forced into half-pipe shaped grooves formed in a solid mandrel), though other geometries are certainly a design option, depending on the shape of the solid mandrel grooves. This consolidated node structure shows a distinction in structure compared to the prior art junctions where weaving and/or braiding are used. Most notably, a build-up of material in the node resulting from coupling the material from various members in various directions allows for the forming of a consolidated node that is compacted and cured, adding strength to the overall structure. Rather than stacking each layer directly on top of the next, the leaving as in FIGS. 8 and 9 allows for individual wraps 36 of tow or tape to end up side-by-side and stacked as a function of the geometry they are forced into before curing. Likewise, FIG. 11 sets forth an exemplary consolidated node sectioned orthogonally to the longitudinal axis depicting the change in member width approaching the node and massing of layered material near and on the node as just described.

In further detail with respect to the embodiments shown in FIGS. 1-11, the present disclosure relates to helical cross supports wrapped around a centerline where the helical cross supports have curved segments rigidly connected end to end and layered with or without axial, radial, or laterally configured cross supports (e.g., longitudinal and/or circumferential cross supports) which can be straight or curved end to end. The curves of the helical cross support segments can comply directly with the desired geometric shape of the overall unit. In other words, the lattice support structure comprises no structural segments protruding beyond the outer circumference. In one embodiment, the structure can include at least two helical cross supports. As described above, at least one of the helical cross supports wraps around the centerline in one direction (clockwise from top to bottom, for example) while at least one other wraps around in the opposite direction (counterclockwise from top to bottom, for example). Though a "top to bottom" orientation is described, this is done for convenience only, as these structures may be oriented other than in a vertical configuration (horizontal, angular, etc.). Helical cross supports wrapped in the same direction can have the same angular orientation and pitch, or can have different angular orientations and pitch. Also, the spacing of the multiple helical cross supports may not necessarily be spaced apart at equal distances, though they are often spaced at equal distances. The reverse helical cross supports can be similarly arranged but with an opposing angular direction. These helical cross supports can cross at multi-layered nodes, coupling counter oriented helical cross supports through layering of the filaments. This coupling provides a ready distribution of the load onto the various structural supports. When viewed from the centerline, the curving segments of the components can appear to match the desired geometry of the structural unit with no significant protrusions, i.e. a cylindrical unit appears substantially as a circle from the centerline. In this embodiment, all components can share a common centerline.

Additional structural supports can also be included in the lattice support structure. Components which are straight from junction to junction may be included to intersect multi-layered nodes parallel to the centerline to form unidirectional members (e.g. longitudinal cross supports). Components, which can be curved or straight, can also be added circumferentially to intersect with the multi-layered nodes along the length of the lattice support structure. These circumferential cross supports can be added to increase internal strength of the structure. These additional members may be added to intersect at the multi-layered nodes, but do not necessarily need to intersect the nodes formed by the helical cross supports crossing one another, e.g. they may cross at areas between helical-helical nodes. In other words, the longitudinal cross supports and/or the circumferential cross supports may form common multi-layered nodes with helical-helical formed multi-layered nodes, or can form their own multi-layered nodes between the helical-helical formed multi-layered nodes. In either case, the multi-layered nodes can still be formed using filament layering. The count of helical members compared to other members is flexible in certain embodiment to allow for multi-layered nodes to occur only as lattice support structures intersect in a given location, or to allow for multiple node locations composed of two or more, but not all of the members in the structure. The capability of such a design allows versatility in the number of helical cross supports, the coil density, as well as the number of multi-layered nodes or intersections with axial, radial, or lateral components. As a general principle, the more strength desired for an application, the higher the coil density; whereas, the less strength desired, the fewer coils and wider the wrap length per coil may be present.

Structural supports may be covered with a material to create the appearance of a solid structure, protect the member or its contents, or provide for fluid dynamic properties. The current disclosure is therefore not necessarily a traditional pipe, rope, coil, spring, or solid shaft, neither is it a reinforcement for a skin cover. Even though the structures disclosed herein are relatively lightweight, because of its relative strength to weight ratio, these lattice support structures are strong enough to act as stand-alone structural units. Further, these structures can be built without brackets to join individual lattice support structures.

Figure 11:
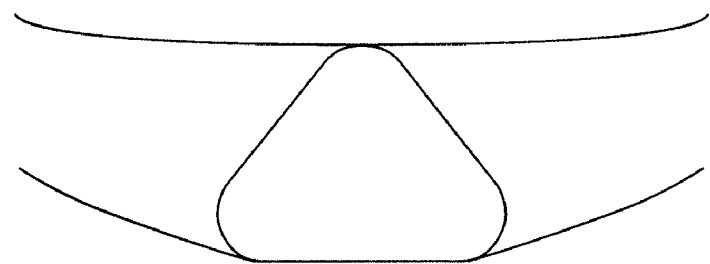
FIG. 11 depicts an exemplary consolidated node sectioned orthogonally to the longitudinal axis depicting the change in member width approaching the node and massing of layered material near and on the node.

In accordance with one embodiment, the present disclosure can provide a lattice structure where individual supports structures are wrapped with unidirectional tow, where each helical cross support, for example, is a continual strand. Further, it is notable that an entire structure can be wrapped with a single strand, though this is not required. Also, the lattice support structures are not weaved or braided, but rather, can be wrapped layer by layer where a leaving structure is created in the nodes. Thus, where the helical cross supports intersect one another and/or one or more longitudinal and/or circumferential cross supports, these intersections create multi-layered nodes of compounded material which couple the members together. In one embodiment, the composite strand does not change major direction at these multi-layered nodes to form any polyhedral shape when viewed from the axial direction. FIG. 11 as a cross section of a longitudinal member depicts the extent of the bending of the helical members intended in this disclosure. This is also evident in FIGS. 1-5 through the creation of cylindrical parts using this technology. Thus, the strand maintains their path in its own axial, circumferential, or helical direction based on the geometry of the part. Once wrapped in this manner, the multi-layered nodes and the entire part can be cured and/or fused as described herein or by other methods, and the multi-layered nodes can be consolidated As discussed in greater detail below, it is also noted that these lattice support structures can be formed using a rigid mandrel, having grooves embedded therein for receiving filament when forming the lattice supports structure. Being produced on a mandrel allows the cross-sectional area of the cross supports making up the structural support unit to be specifically controlled. For example, individual cross supports may comprise a cross-sectional area that is round (see FIG. 12A), rectangular (see FIG. 12B), T-shaped or flanged (see FIG. 12C), I-beam shaped or double flanged (see FIG. 12D), or virtually any other shape or configuration.

FIGS. 13A-13F further illustrate that these cross-sectional shapes or configurations may further comprise rounded corners, as well as linear and/or nonlinear sides, or a combination of such. For instance, FIG. 13A illustrates a cross support having a generally rectangular shape, with a flat inner surface (surface facing toward the centerline of the structural support), rounded upper corners, and a generally convex outer surface (surface facing away from the centerline). FIG. 13B illustrates a cross support having a generally half-circle cross-sectional shape, with an outer surface being generally convex. FIG. 13C illustrates a cross support having a generally triangular cross-sectional shape, with each corner being rounded. FIG. 13D illustrates a cross support having a triangular shape, with no rounded corners. FIG. 13E illustrates a cross support having a generally triangular cross-sectional shape, with an upper rounded corner, and a generally flat outer surface. FIG. 13F illustrates a cross support having a generally triangular cross-sectional shape, with an upper rounded corner, and a generally convex outer surface. The several cross-sectional areas or configurations illustrated in the FIGS and discussed herein are merely exemplary of the several configurations made possible by controlling the tooling used to produce the cross supports. By controlling the tooling, and particularly the channels or grooves of the mandrel, the cross-sectional area of individual cross supports (and multi-layered nodes) can be specifically controlled and optimized for a given design. It is noted also that not all cross supports within a given lattice support structure are required to comprise the same cross-sectional area or configuration. Indeed, a lattice support structure may comprise a plurality of cross supports with different cross-sectional areas.

Figure 14A:
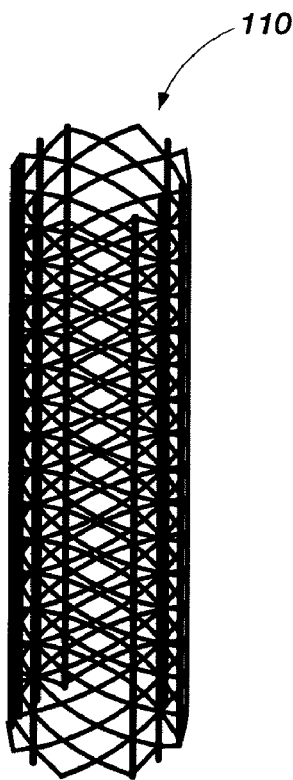
FIGS. 14A-14C depict an exemplary lattice support structure having a plurality of longitudinal and helical cross supports, wherein the longitudinally oriented cross supports comprise a t-shaped cross-sectional geometry.
Figure 14B:
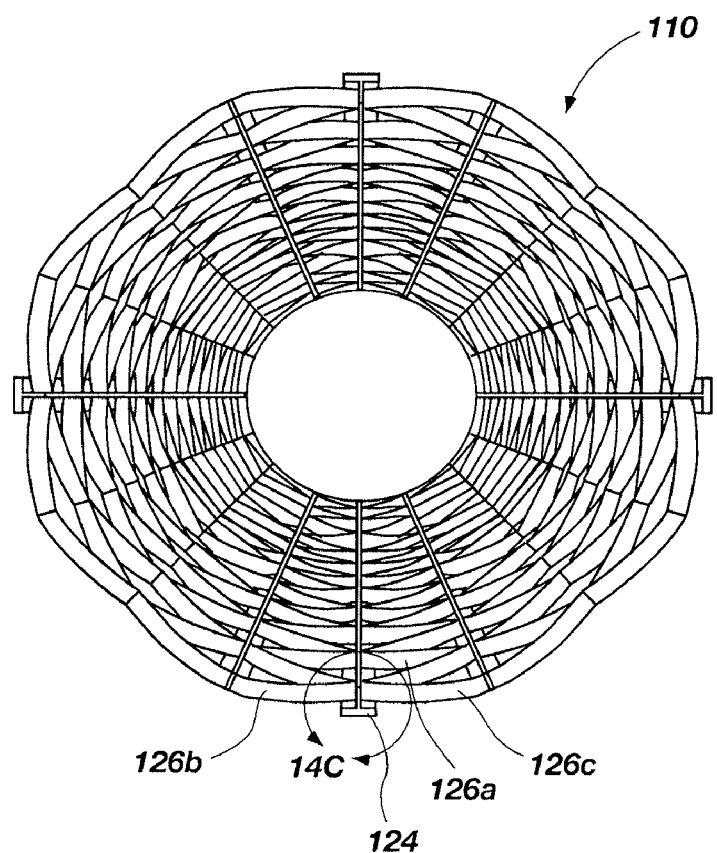
Figure 14C:
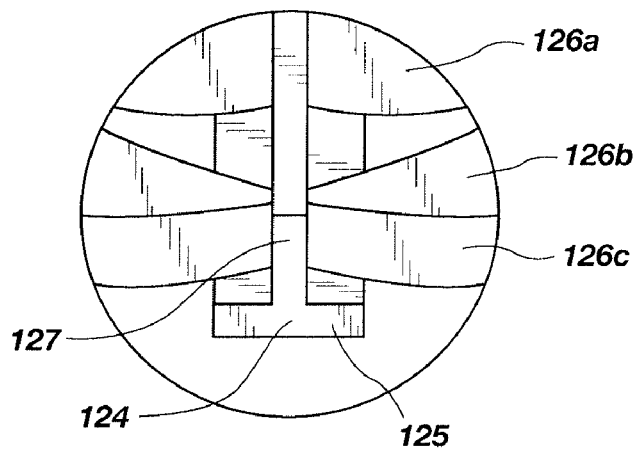

With reference to FIGS. 14A-14C, illustrated is a composite lattice support structure 110 formed in accordance with another embodiment of the present invention. FIGS. 14A and 14B illustrate a plurality of helical cross supports, including helical cross supports 126a, 126b and 126c that intersect to from various multi-layered nodes. In addition, the support structure 110 comprises a plurality of longitudinal cross supports, such as longitudinal cross support 124, each having a T-shaped cross section. As shown, the outer surface of the T-shaped (the surface facing away from the centerline) comprises a generally flat or linear surface configuration. The inner surfaces (those facing toward the centerline) also comprise a generally flat or linear configuration. However, in this particular embodiment, rounded corners having a given radius r are included where the flange portion 125 intersects with the web portion 127.

Figure 15:
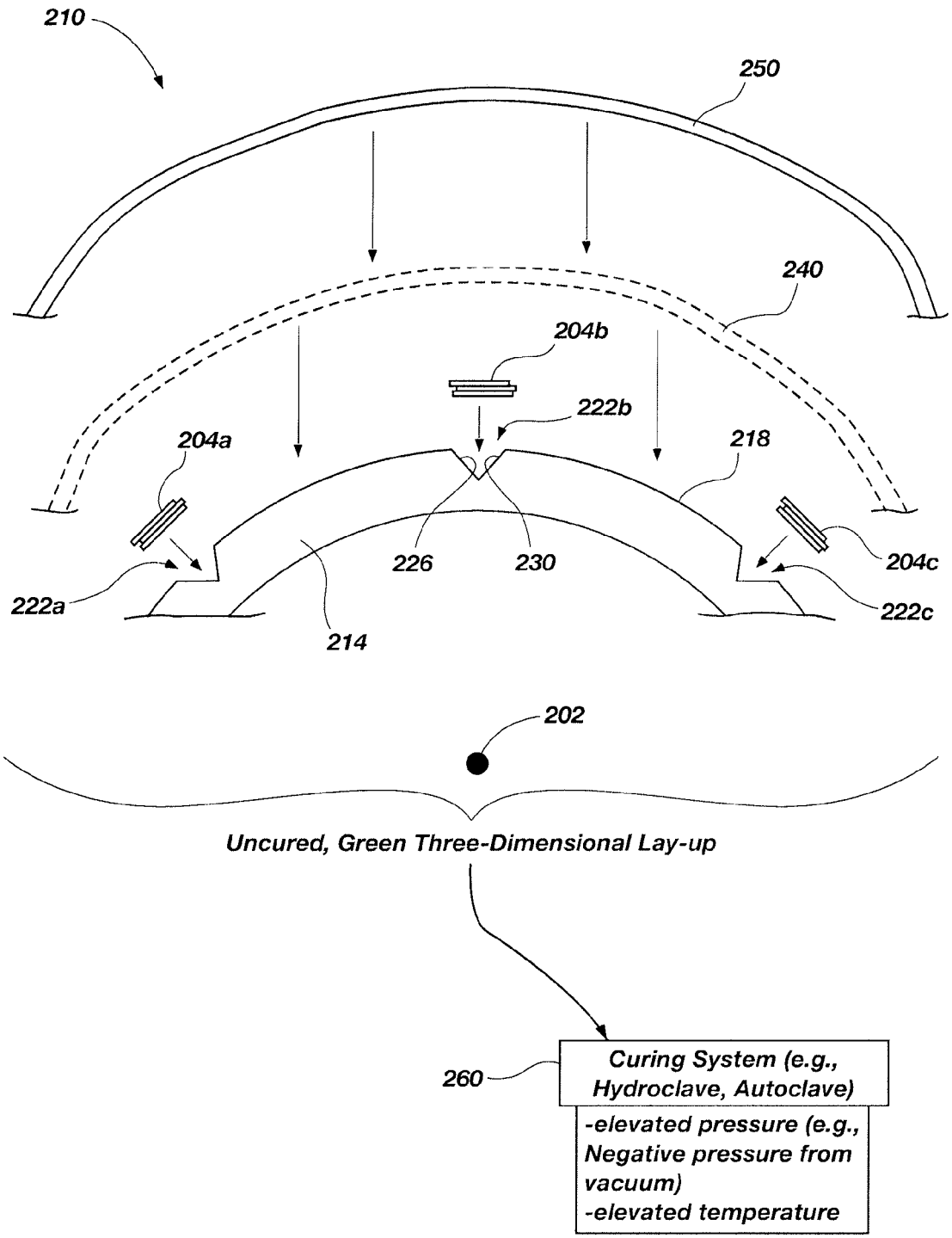
FIG. 15 depicts a partial cross-sectional view of a system used to fabricate a lattice support structure in accordance with an exemplary embodiment of the present invention.

With reference to FIG. 15, illustrated is a partial cross-sectional view of a system for fabricating complex three-dimensional lattice support structures in accordance with one exemplary embodiment of the present invention. The system 210 comprises a rigid mold in the form of a three-dimensional (e.g., in this case generally cylindrical), elongate, rigid, collapsible mandrel 214 having a working surface 218 and a plurality of channels in the form of grooves (see grooves 222a, 222b, and 222c) formed in the working surface 218. The grooves are formed within the working surface in a manner so as to comprise or define a network of grooves intersecting at strategic locations. The grooves cooperatively establish a substantially continuous interconnected lattice corresponding to a three dimensional geometric configuration to be imparted to a composite, fiber-based material layup, and subsequently to a composite lattice support structure formed therefrom. The particular lattice configuration provided by the rigid mold may be any type of lattice configuration capable of being formed, and capable of providing a composite support structure. The various channels may be formed about the working surface on a variety of orientations relative to a centerline 202 of the rigid mold, such as on a helical orientation, a longitudinal orientation, a circumferential or lateral orientation, an orthogonal orientation, etc. In addition, the rigid mold may comprise any number or density of all or a combination of these channels, and may locate these at any location. As such, the rigid mold, and particularly the channels formed therein, may define any number of nodes where the channels intersect one another, which nodes may be present in any number, location, etc. as provided by the intersecting channels. Furthermore, the rigid mold may comprise any size (length, width, height or depth) of channels. The size of the channels will influence the size of the cross supports formed in these channels. Along with other factors, the size will contribute to the performance characteristics (e.g., strength, torsional stiffness, etc.) of the fabricated composite structural support. The design parameters discussed here will largely be dependent upon the composite support structure desired or required for a particular application. In any event, the present invention contemplates rigid molds, and ultimately the composite support structures derived from these, that are highly adaptable or customizable.

In accordance with various embodiments, the channels may be formed within the rigid mold in accordance with various techniques, such as machining, etching, additive or subtractive (material removal) manufacturing, laser material removal, water jet material removal, etc. In addition, the rigid mold may be formed from a variety of materials capable of providing a rigid makeup, including metals and many non-metals. In many cases, aluminum will be the material and technique of choice as it provides a very rigid material easily machined using a computer controlled machining process, such as a computer-aided drafting based computer numerical controlled (CNC) milling process. The more rigid the mold, the better the finished structural support as the fiber material is caused to compact to a greater degree of compaction since the channel substantially maintains its shape or form as the sides or surfaces within the channel undergo little or no lateral flex or expansion in response to the applied pressure. It is noted that a certain amount of expansion within the mandrel will occur as it is subjected to elevated temperatures. This expansion will most likely be greater in the longitudinal direction, with lateral expansion being mostly negligible as far as its impact on the compaction of the fiber materials within the grooves and the consolidation of the fiber material and resin. Therefore, materials providing little or no lateral flex or expansion within the channels or grooves will produce parts with higher quality and better performance characteristics than materials with some flex or expansion by facilitating a more dense compaction and more complete consolidation of the fiber materials and resin within the channel.

The rigid mold may further be configured to include thermal rise calculations that allow for a degree of expansion of the composite fiber-based materials without overstressing the particles within the fiber, thus increasing the pressure curve across the lattice support structure and further enhancing consolidation.

The channels of the rigid mold are intended to define various surface boundaries depending upon the particular cross-sectional shape desired. In the embodiment shown, the grooves 222 comprise a triangular cross-section (when viewed in the axial or longitudinal direction of the rigid mold), with surfaces 226 and 230 providing the boundary of the grooves. The grooves may be formed in the mandrel 214 in any configuration or design that provides a lattice or lattice-type configuration. Although shown in cross-section, it is contemplated that the mandrel 214 will comprise an elongate, three-dimensional form or shape, again with some grooves being helically oriented, longitudinally oriented, laterally oriented, different in length, different in cross-sectional area, etc. Whatever the desired or required configuration of the final lattice support structure, the mandrel 214 functions as the template or mold to provide this. Not only does the mandrel, and particularly the grooves of the mandrel, define the number, type, density, orientation etc. of the various cross supports, but it also defines the same types of parameters regarding the multi-layered nodes making up the lattice support structure. Furthermore, the mandrel permits the cross-sectional area of the cross supports and nodes making up the structural support unit to be specifically controlled, the types of specific cross-sectional areas being limited only by the limitations inherent in the formation of the grooves in the mandrel.

The grooves are intended to extend about the outer surface of the rigid mold (e.g., about the circumference of the cylindrical mandrel as shown) in a given direction and orientation, at least some of which are caused to intersect at various strategic locations to provide the mold with, and define the lattice configuration of, the particular lattice support structure to be formed. It is noted that the mandrel provides a key component in the formation of a seamless, three-dimensional lay-up of fiber materials, in the presence of resin, resulting in a seamless finished three-dimensional lattice support structure. In other words, there are no joined or fused part edges present either prior to consolidation during the formation of the uncured, green lay-up, or after consolidation of the fiber material and resin components resulting in a finished or substantially finished support structure. The part is formed and cured as a seamless structure.

Although shown and described as being cylindrical, the mandrel may comprise a number of different cross-sectional areas other than circular as viewed in the axial direction. For example, the mandrel may comprise a triangular, square, oval, airfoil, octagonal, hexagonal, rectangular, or arbitrary (comprising a linear or non-linear geometry, or a combination of these) cross-sectional geometry. In addition, the mandrel may comprise both large and small sizes, in terms of both length and cross-sectional area, to produce composite lattice support structures of all sizes. For example, the present invention system and method may be employed to fabricate large structural members for use in towers or other similar supports. Depending upon their height and load requirements, one or more composite lattice support structures may be fabricated to construct the tower. For example, in one aspect, a plurality of single length lattice support structures may be fabricated that operate together to provide the major components of the tower structure. In another aspect, several smaller length composite lattice support structures may be fabricated and then joined together end to end to provide the same required length of major components of the tower structure.

As indicated herein, the rigid mold, and more particularly the channels of the rigid mold, receive the fiber material lay-up during a deposition process during fabrication. As shown, the lay-up includes fiber materials that are deposited in the grooves 222 of the mandrel 214 in the presence of resin. FIG. 15 illustrates one embodiment where a preimpregnated (prepreg) tow or towpreg filament is situated for deposit into the various grooves of the mandrel (see towpregs 204a, 204b, and 204c to be deposited in grooves 222a, 222b, and 222c, respectively). The towpreg may be deposited in accordance with various methods or techniques used to lay up a fiber material. In one exemplary embodiment, the towpreg may be deposited in accordance with a filament winding technique in which the towpreg is wound onto the mandrel within the grooves at a pre-determined tension and as the mandrel rotates about a rotational axis. The towpreg may comprise various types and sizes, and may comprise various numbers of fibers, such as a 10K tow, a 12K tow, a 50K tow, a 80K tow, etc. Fiber materials other than towpreg filaments are also contemplated for use, such as prepreg tape and others as will be apparent to one skilled in the art. In addition, fiber material that is not preimpregnated, but rather post-wetted, may also be used. For instance, a dry fiber-based tow may be subjected to a resin component in situ during a winding process as it is being deposited within the channels of the rigid mold.

The system further comprises a vacuum enclosure 250 adapted for placement over the mandrel and fiber material lay-up that facilitates the drawing of a vacuum about the mandrel for assisting in the consolidation of the fiber materials and resin components. The vacuum enclosure 250 is designed to provide the pressure necessary to cure and consolidate the fiber materials in the presence of the resin, and most likely in the presence of elevated temperature. More specifically, the vacuum enclosure 250 may be adapted to apply the pressure necessary to compact the fiber material into the grooves 222 of the mandrel 214 to enhance consolidation and form the cross supports and nodes as discussed herein, as well as provide these with their specified cross-sectional geometry. The vacuum enclosure 250 is intended to seal about the mandrel 214, and particularly about the outer working surface 218 of the mandrel 214, and any additional surfaces to effectuate a proper negative pressure environment.

Advantageously, when placed in operation with the rigid mold having the plurality of channels, inherent flow paths for air flow and excess resin drainage are provided. Indeed, any excess resin will flow out of the channels formed in the rigid mold, thus eliminating the need for a separate bleeder material. Although a breather/bleeder layer may be used in some instances, it has been discovered that a breather/bleeder layer may actually reduce the performance characteristics of the formed lattice support structure in some cases. For example, a breather/bleeder may actually diffuse or absorb pressure rather than transfer and concentrate pressure like the pressure transfer layer. At the very least, the breather may not be necessary as such a layer is not required to remove air during the drawing of the vacuum as such air removal is facilitated by the plurality of channels in the rigid mold.

The vacuum enclosure 250 can comprise a flexible, impermeable vinyl membrane or other similar traditional vacuum bag. Alternatively, the vacuum enclosure 250 can comprise a resilient polymer (e.g., two part prepolymer, polyurea or polyurethane) vacuum bag specifically formulated to provide elasticity and elongation, such as a vacuum bag product formed in accordance with the technology developed and owned by American Consulting Technology and Research Co. of Provo, Utah, and marketed under the VacuSpray trademark.

The prepolymer composition may comprise any component or group of components which combine to form a layer that rapidly polymerizes (preferably within seconds or minutes depending upon the composition), at ambient conditions, about a surface to which it is applied to form a semi-rigid, flexible member. In one exemplary embodiment, the prepolymer may comprise a polyurea-based composition made by combining an "A" side isocyanate component with a "B" side resin blend component, wherein these two components may be mixed in a spray device and dispensed therefrom. The isocyanate component may be further broken down into an isocyanate building block, such as an MDI monomer, connected to a flexible link with a urethane bond. The isocyanate building block may have reactive end groups selected from a group consisting of polyol or amine, and the flexible link can be selected from a group consisting of polyether, silicone, polybutadiene or other low 'Tg' segments.

To enable rapid polymerization, the isocyanate component, or "A" side, may be mixed with the resin blend, or "B" side component, which in one embodiment, comprises an amine-terminated polymer resin. When mixed together, the two A and B side components combine by way of a urea bond to form a long, polyurea-based molecule, which then cross-links with other similar molecules to form the semi-rigid, reusable polymer vacuum bag of the present invention.

The present invention contemplates many different types or variations of the prepolymer composition. For purposes of discussion, an exemplary first specific type of polyurea-based prepolymer composition comprises a two part polyurea, namely an "A" side polymeric MDI comprised of diphenylmethane-diisocyanate (MDI), and modified MDI; and a "B" side polymeric polyol comprised of aliphatic amines (polyoxypropylene diamine), di-ethyl toluene diamine (DETDA). The "A" side may be present in an amount by weight between 25 and 40 percent, and preferably between 30 and 35 percent. The "B" side may be present in an amount by weight between 60 and 75 percent, and preferably between 65 and 70 percent.

An exemplary second specific type of polyurea-based prepolymer composition comprises a two part polyurea, namely an "A" side aromatic isocyanate comprised of polyurethane prepolymer, diphenyl methane-diisocyanate (MDI), and alkylene carbonate; and a "B" side aromatic polyurea comprised of polyoxyalkyleneamine, diethyltoluenediamine (DETDA), and polyoxyalkyleneamine carbon black. The "A" side may be present in an amount by weight between 40 and 60 percent, and preferably between 45 and 55 percent. The "B" side may be present in an amount by weight between 40 and 60 percent, and preferably between 45 and 55 percent.

The polymer vacuum bag may comprise a prepolymer that can be applied in liquid form (e.g., a spray or brush-on prepolymer) over the mandrel and fiber materials, which is then caused to polymerize to provide a sealed vacuum enclosure. In another aspect, the prepolymer composition may be applied over another suitable and applicable surface, polymerized or cured to form a pre-formed polymer vacuum bag, and then subsequently applied over the mandrel and fiber material lay-up.

The system 210 further comprises a dynamic, resilient pressure transfer layer (PTL) 270 that specifically concentrates pressure in select locations or regions about the rigid mold and fiber-based lay-up for enhancing the consolidation of the composite fiber-based lay-up. The PTL is designed to be present between the vacuum enclosure and the mandrel, unless the PTL is the vacuum enclosure as discussed below. Specifically, the PTL distributes or transfers pressure within the vacuum enclosure from the non-grooved portions of the rigid mold to regions about the channels or grooves and to the composite fiber-based lay-up within the channels, thus concentrating the pressures in these areas, to facilitate greater compaction of the fiber-based lay-up within the channels. Effectively, the PTL 270 functions to significantly reduce the size and number of voids in the material, thus facilitating as close to complete consolidation as possible over systems not employing a pressure transfer layer.

In composites manufacture, one of the primary concerns is in achieving adequate consolidation. Industry standards have resulted in parts that are not optimally consolidated, but yet still perform fairly well. One skilled in the art will acknowledge that the composited industry suggests that longitudinal tension in the part up to 75 lbf is necessary to achieve the proper strength in the structural members. However, it has been discovered that the longitudinal tension is not the only factor which provides the best consolidation and performance of the part, although this certainly may likely be at least a contributing factor. Advantageously, using a rigid mold that exhibits only negligible movement through expansion during the cure cycle, and a PTL such as that provided by a silicone layer or the VacuSpary product, radial pressure may be applied directly on the composite fiber material lay-up resulting in near 100% consolidation. Thus, use of a PTL coupled with a solid or rigid mandrel, usually metal-based, provides optimal consolidation without requiring the degree of longitudinal tension thought to be needed in prior related systems to achieve good consolidation.

The action of a PTL, whether VacuSpray or a silicone wrap, is to provide a resilient material over the composite structure which will successfully allow a majority (e.g., more than 60%) of the pressure from the cure cycle (90 psi-200 psi) to be directly applied to the composite fiber-based lay-up. The PTL will shrink slightly on the tool, which actually adds to the pressure applied about the mandrel and the lay-up. With a silicone PTL, whether a standard vinyl vacuum bag or resilient polymer (e.g., VacuSpray) vacuum bag is used, the PTL will shrink during the cycle to add the extra pressure. With a standard bag, a silicone or other similar PTL will most likely be needed. However, a standard vacuum bag, by itself, does not shrink enough on its own. The PTL eliminates the voids through coupling the pressures and increasing pressure transfer efficiency to the composite. The pressure profile remains constant on the composite with the PTL.

Pressure distribution and concentration about the channels and composite fiber-based lay-up results from the resilient nature or makeup of the PTL 270, wherein the PTL 270 exhibits properties of elasticity and elongation about the working surface of the rigid mold under pressure. In other words, the PTL is adapted to displace about and conform to the working surface of the rigid mold in response to the applied pressure, and to facilitate the concentration of this pressure to the channels and the composite fiber-based lay-up. The PTL 270 is intended to be applied directly over the rigid mold and the composite fiber-based lay-up. Due to the three-dimensional nature of the rigid mold and the fiber-based lay-up, the PTL 270 typically will comprise a similar size and geometry (e.g., similar cross-sectional area and length) as the composite fiber-based lay-up and rigid mold so that it is able to suitably fit and perform as intended.

Referring now to FIG. 16A and 16B, during a curing cycle as the preform is subjected to elevated temperature and pressure, a force F is applied to the working surface 218 of the mandrel 214 and the fiber-based composite lay-up 204 through the PTL, which force is shown as force $F_1$ and force $F_2$. Force $F_1$ represents the force applied about the portions of the working surface between channels or grooves 222, while force $F_2$ represents the force acting about the grooves 222 and the composite fiber-based lay-up. As pressure is initially applied (e.g., by initiating the drawing of a vacuum within the vacuum enclosure) the vacuum enclosure 250 operates to press the PTL 270 against the mandrel 214, thus creating the above-described forces acting on the working surface 218 and the composite fiber-based lay-up 204. FIG. 16A illustrates the system under an initial, slightly increased pressure, wherein the PTL 270 is caused to begin to conform to the working surface 218 of the mandrel 214. As pressure is increased, as shown in FIG. 16B, the PTL 270 may begin to stretch or elastically deform or displace and conform to the intricate working surfaces of the rigid mold, including the channels formed therein. This dynamic displacement will continue to some degree typically until the pressure stabilizes or is held constant, such as at a desired pre-determined maximum pressure for curing the lay-up. At this point, the PTL may be caused to fully fill the volume of space above the fiber-based material within the groove providing a near all points contact with the fiber-based material.

The PTL 270 is designed to stretch in multiple directions as illustrated by the force components of force $F_1$. Multi-directional stretch or elongation of the PTL 270 functions to concentrate the forces about the grooves 222 and the composite fiber-based lay-up 204 as intended. Under a significant enough pressure, the PTL 270 displaces about the working surface 218 of the mandrel 214 and conforms to the intricacies of the working surface 218. At the locations of the grooves 222, the PTL 270 is able to stretch to extend below an edge of the working surface 218 provided by the groove 222 until coming in contact with the fiber material 204 deposited within the groove 222. The pliable nature of the PTL 270 permits the PTL 270 to substantially follow the contour of the working surface 218 including the downwardly inclined surfaces 226 and 230 of the groove 222 to contact the exposed surface(s) 206 of the fiber material 204. Being able to conform in this manner provides an increase of surface area of the PTL 270 in contact with the fiber material 204, thus enhancing the compaction of the fiber material 204 into the groove 222, and thus optimizing the percentage of fiber material and resin that is consolidated. Indeed, high levels of consolidation (90-100% or even 98-100%) can be achieved. In other words, porosity of the consolidated material providing voids and weak spots in the structure are significantly reduced or even virtually eliminated. In addition, the forces acting on the fiber material 204 by the PTL 270 are not diminished, but rather evenly distributed across the groove 222 and the exposed surface 206 of the fiber material 204. The rigid surfaces 226 and 230, along with the PTL 270 function to contain the fiber material during the compaction and consolidation and curing processes to impart the specific cross-sectional geometry to the particular cross member being formed in the groove 222. This same concept is applicable throughout the network of channels or grooves of the mandrel 214.

FIG. 16B further illustrates the contour of the exposed surface 206 of the composite fiber-based lay-up. This surface 206 may be caused to be generally flat, or generally concave or convex depending on the amount of fiber material deposited within the grooves. A relatively greater amount of fiber material will generally result in a convex configuration after consolidation. Conversely, a relatively lesser amount of fiber material will generally result in a concave configuration after consolidation.

The PTL can be a separate component or it may comprise the actual vacuum enclosure itself, thus doubling the functionality of the vacuum enclosure. As shown in FIG. 15, the system may comprise a separate and individual PTL component 270 (shown in phantom view) that is disposed or situated between a separate vacuum enclosure component 250 and either an optional release layer 240 and/or the working surface 218 and composite fiber-based lay-up 204 within the grooves 222 of the mandrel 214. In one exemplary embodiment, the PTL comprises a preformed or polymerized siloxanes or polysiloxanes material, typically known as a silicone material. The silicone PTL may comprise different synthesized compositions, but is intended to comprise a makeup capable of providing elastic or rubberlike properties in order to be resilient and provide the dynamic functionality described herein. In another exemplary embodiment, the PTL 270 may comprise a material capable of functioning both as the pressure transfer layer and the vacuum enclosure. For example, in one aspect, the PTL 270 may comprise the polyurea-based resilient polymer VacuSpray vacuum bag described above. Stated differently, the polyurea-based resilient polymer vacuum bad 250 shown in FIG. 15 exhibits elastic or rubberlike properties capable of dynamically displacing about and conforming to the intricate working surface 218 of the mandrel 214 to concentrate the applied pressure about the grooves 222 and onto the fiber material lay-up to compact the fiber material 204 within the grooves 222. The polyurea-based polymer component may be applied in liquid form as a prepolymer, and then later polymerized, or it may be pre-formed and applied in a similar manner as the silicone-based PTL. Other similar types of resilient or elastic materials may be available and applicable as will be recognized by one skilled in the art.

The system 210 further comprises an optional release layer 240 that may be disposed between the vacuum enclosure and the mandrel and fiber material lay-up to facilitate easy removal of the vacuum enclosure from the mandrel surface and/or the formed composite lattice support structure. The release layer 240 may comprise any material known in the art, such as a fluoropolymer (PTFE (polytetrafluoroethylene) and PFA (perfluoroalkoxy polymer resin)) or FEP (Fluorinated ethylene propylene), or others. Depending upon various factors, such as the type of vacuum enclosure used, a release layer may or may not be needed. In the event a PTL is used, the PTL will function as a release, thus eliminating the need for a separate FEP or other release material.

It is noted that the specific performance characteristics inherent within and exhibited by various composite lattice support structures formed in accordance with the systems and methods employed herein may be manipulated by selectively manipulating not only the design parameters or configuration of the cross support and nodal members, but also the components used in the fabrication of such components. In other words, performance of any given structural support may be affected by the particular components used in the fabrication of such support structures. For instance, a support structure formed using a more traditional vinyl vacuum enclosure without a pressure transfer layer may result in a part that does not perform as well as a similarly sized and configured part fabricated using a pressure transfer layer. This may be desirable for some applications, factoring costs, engineering specifications, structural requirements, etc. In any event, it has been discovered that a pressure transfer layer provides fabrication of superior support structures over those manufactured without a pressure transfer layer.

The system 210 further comprises a curing system 260 operable to consolidate and cure the fiber materials and resin to form the cross supports and nodes (and any collars) of the lattice support structure. The curing system 260 is designed to subject the fiber material lay-up to elevated pressure and temperature for a given duration of time. The curing system 260 may comprise an autoclave or other suitable device capable of applying the necessary heat and pressure to the lay-up.

Figure 17:
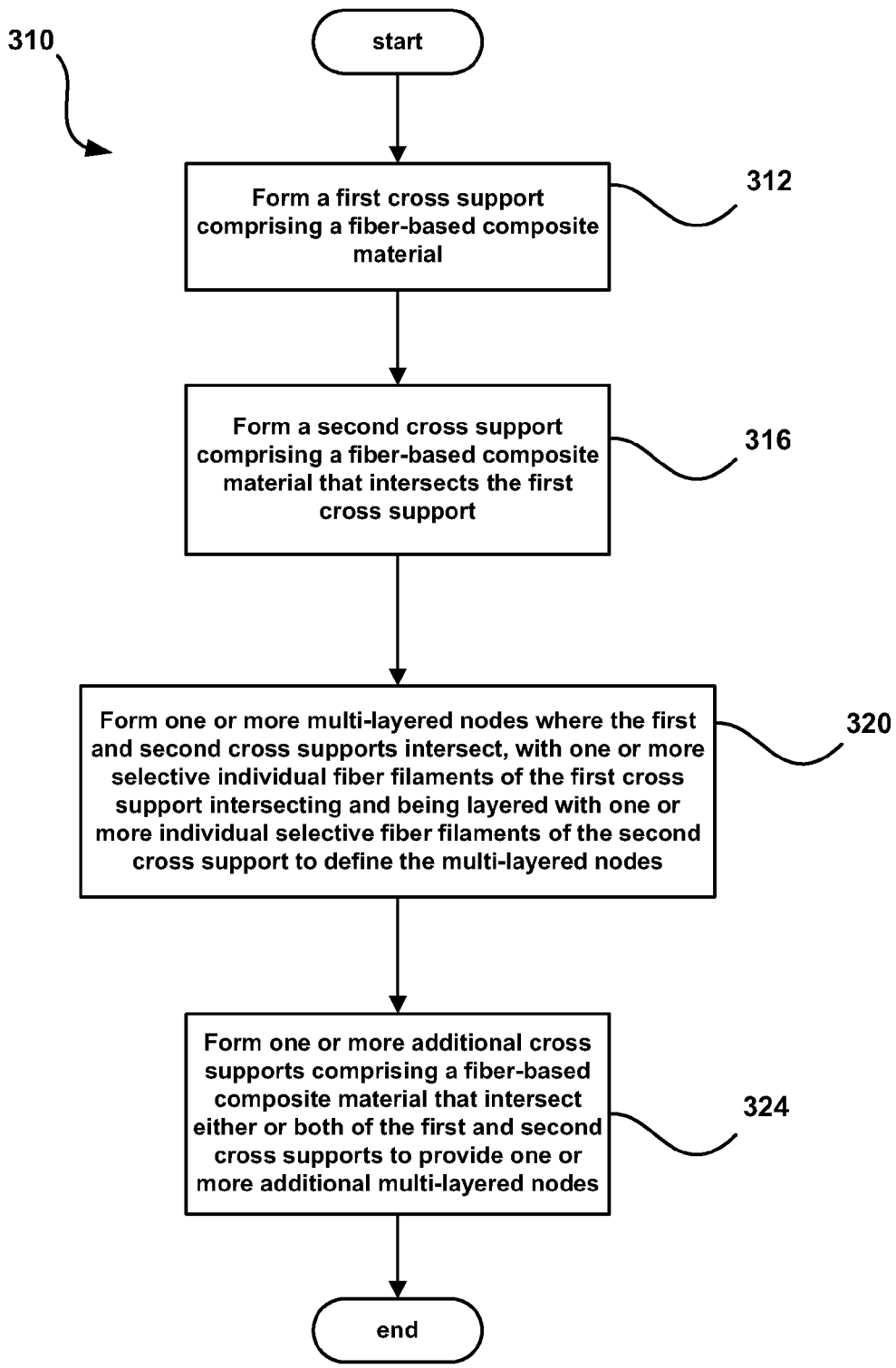
FIG. 17 depicts a flow chart of an exemplary fabrication method.

FIG. 17 illustrates a flowchart of a method for forming a composite lattice support structure in accordance with one exemplary embodiment. The method comprises generally forming first 312 and second 316 cross supports, each of these comprising a fiber-based composite material. The first and second cross supports are caused to intersect one another in one or more locations to define one or more multi-layered nodes 320. The multi-layered nodes are each comprised of one or more selective fiber filaments (individual filaments or layers of filaments) from the first cross support that intersect and layer with one or more selective fiber filaments of the second cross support. In one aspect, this may mean that the multi-layered nodes comprise at least two layers of the first cross support separated by at least one layer of the second cross support. In another aspect, this may mean that the multi-layered nodes comprise at least two layers of the second cross support separated by at least one layer of the first cross support.

The method further comprises forming one or more additional cross supports 324, also comprising a fiber-based composite material, that intersect one or both of the first and second cross supports to provide or define additional multi-layered nodes within the lattice support structure. Indeed, it is likely that a present invention lattice support structure will comprise a plurality of cross supports, each contributing to the overall strength and performance of the support structure. The plurality of cross supports, comprising a fiber-based composite material, may each be configured to interrelate with at least one other cross support in the same manner, namely with selective fiber filaments from each being layered with those of another cross support at the intersecting locations where a node is formed.

The several cross supports are configured to form and define a composite lattice support structure having a three-dimensional geometry about a centerline. As a result of the fabrication method, the lattice support structure is capable of being a seamless structure rather than the result of two or more segments or components formed separately and then somehow fused or otherwise brought and held together.

The first and second cross supports and any additional cross supports may be formed into a number of configurations or in accordance with a number of designs to provide different lattice support structures having different performance characteristics. For example, the first and second cross supports may be formed into any one of the support structures shown in the drawings, or described above.

The method for manufacturing described herein allows for a significant amount of versatility in terms of design considerations and options for complex three-dimensional lattice support structures, which is evidenced by the many different configurations described or contemplated herein, some of which are illustrated in the accompanying drawings. For example, the method may comprise forming one or more cross supports to comprise a curved segment between nodes to provide non-linear path loading along the cross support. Depending upon the cross-sectional area of the lattice support structure, curved segments may be present in a plurality of forward or reverse helically oriented cross supports. These helicals may be evenly or unevenly spaced apart from one another (asymmetric spacing), some may have a different pitch than others, some may have a variable pitch or helix angle, and/or they may be present in differing densities about the structure. The support structure may also be formed with a different number or uneven ratio of forward and reverse helicals, thus giving the support structure increased strength in a given direction.

In another example, the support structure may comprise any number of lateral, linear or circumferentially oriented cross supports in combination with the helical or reverse helical cross supports, with these also being present in various size, in various locations, in various concentrations, in various densities, etc. Although the majority of time this will most likely be the case, it is also noted that the cross supports and the nodes they define do not necessarily need to comprise any particular type of pattern or symmetry. Indeed, lattice configurations where nodes are completely randomly located or that are present in higher or reduced concentrations or densities about the support structure are also entirely possible and contemplated.

In many cases, it will be necessary or desirable to form the lattice support structure to comprise areas of selective reinforcement or areas of higher strength. In such cases, forming the lattice support structure to comprise cross supports that are grouped or concentrated in these areas, or that are of differing type and/or orientation (or a combination of these) will enhance the inherent performance characteristics of the lattice support structure in these areas, thus being capable of better meeting often stringent engineering specifications.

Some of the advantageous properties of the present invention composite lattice support structure is that it comprises a constant load path throughout. A related advantage is that, in the event of breakage or failure of one or more cross supports or nodes, the lattice support structure is configured such that the load path is transferred to one or more unbroken cross supports to compensate for the reduction in performance or failure.

The method further comprises forming the cross supports such that the resulting lattice support structure comprises a non-uniform cross section as taken along the longitudinal axis or centerline. Lattice support structures with a uniform cross section are obviously contemplated, but some applications may require those having non-uniform cross-sections.

The method further comprises controlling the cross-sectional geometry of some or all of the individual cross supports within a lattice support structure, which cross-sectional geometry of the cross supports is dictated by the corresponding cross-sectional geometry of the channels of the rigid mold in which the fiber material is initially deposited. Controlling the cross-sectional geometry of the cross supports means controlling the elements and parameters used to fabricate these. For example, to achieve a t-shaped or flanged geometry, the channels of the rigid mold will be configured with a suitable t-shaped or flanged configuration. These will have a suitable and accurate amount of fiber material deposited in them in order to achieve the desired geometry after consolidation.

The method further comprises forming a circumferential collar around or about one or both ends of the lattice support structure, wherein the collar comprises fiber material that is integrally formed and consolidated with the fiber material of one or more cross supports.

The present invention provides a unique method for fabricating or manufacturing the composite three-dimensional lattice support structures discussed above. In one exemplary embodiment, the method comprises wrapping pre-impregnated fiber filaments or tow (e.g., 12K tow) around a rigid, break-away mandrel having a series of grooves or channels formed into the surface of the mandrel generally conforming to the desired configurations or patterns of the various cross members, end collars, multi-layered nodes, etc. to be formed, and providing a solid geometric base for the formation of the support structure during production. Though a secondary wrap, e.g., KEVLAR, may be applied once the structure has been cured or combined with the primary fibers before cure, enhanced consolidation of members can be achieved through covering the uncured structure with a bagging system, creating negative pressure over at least the multi-layered nodes, and running it through an autoclave or similar curing cycle where the fiber prepreg tow is compacted into the grooves, consolidated, and formed generally to the cross-sectional geometry of that of the grooves. This adds strength through allowing segments of components to be formed from a continuous filament, while also allowing the various strands in a single member to be consolidated during curing. Other embodiments and additional detail regarding the fabrication of the present invention lattice support structures are provided below.

Figure 18:
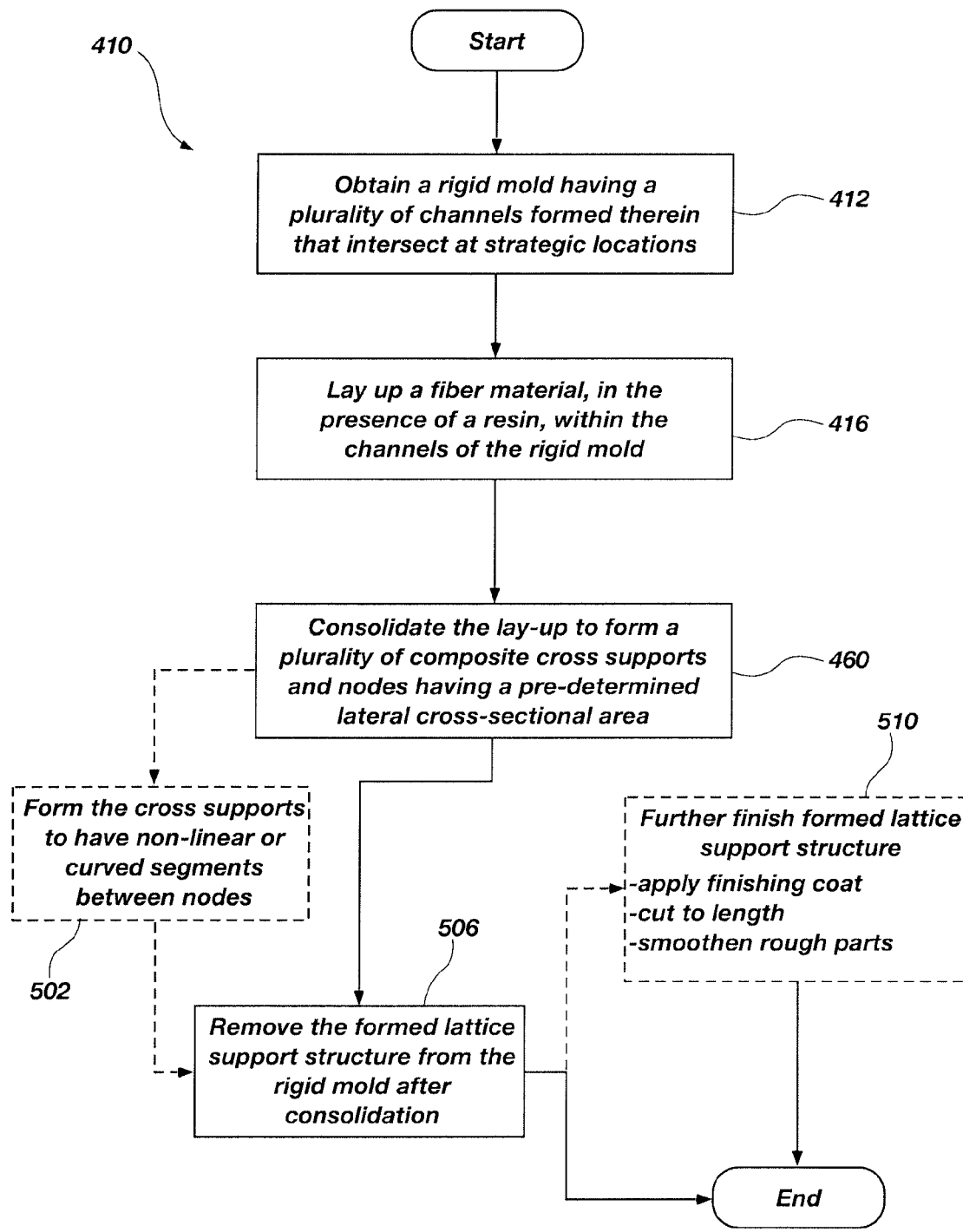
FIG. 18 depicts a flow chart of another exemplary fabrication method.

With reference to FIG. 18, one exemplary method comprises obtaining a rigid mold having a plurality of channels formed therein that intersect at strategic locations (412); laying up a fiber material, in the presence of resin, within the channels of the rigid mold (416); consolidating the lay-up to form a plurality of composite cross supports and nodes having a pre-determined lateral cross-sectional geometry, and to form a three-dimensional lattice support structure (460); removing the formed lattice support structure from the rigid mold (506); and optionally, further finishing the formed lattice support structure (510). The method may further comprise forming the cross supports to comprise a non-linear or curved configuration between nodes (502).

Figure 19:
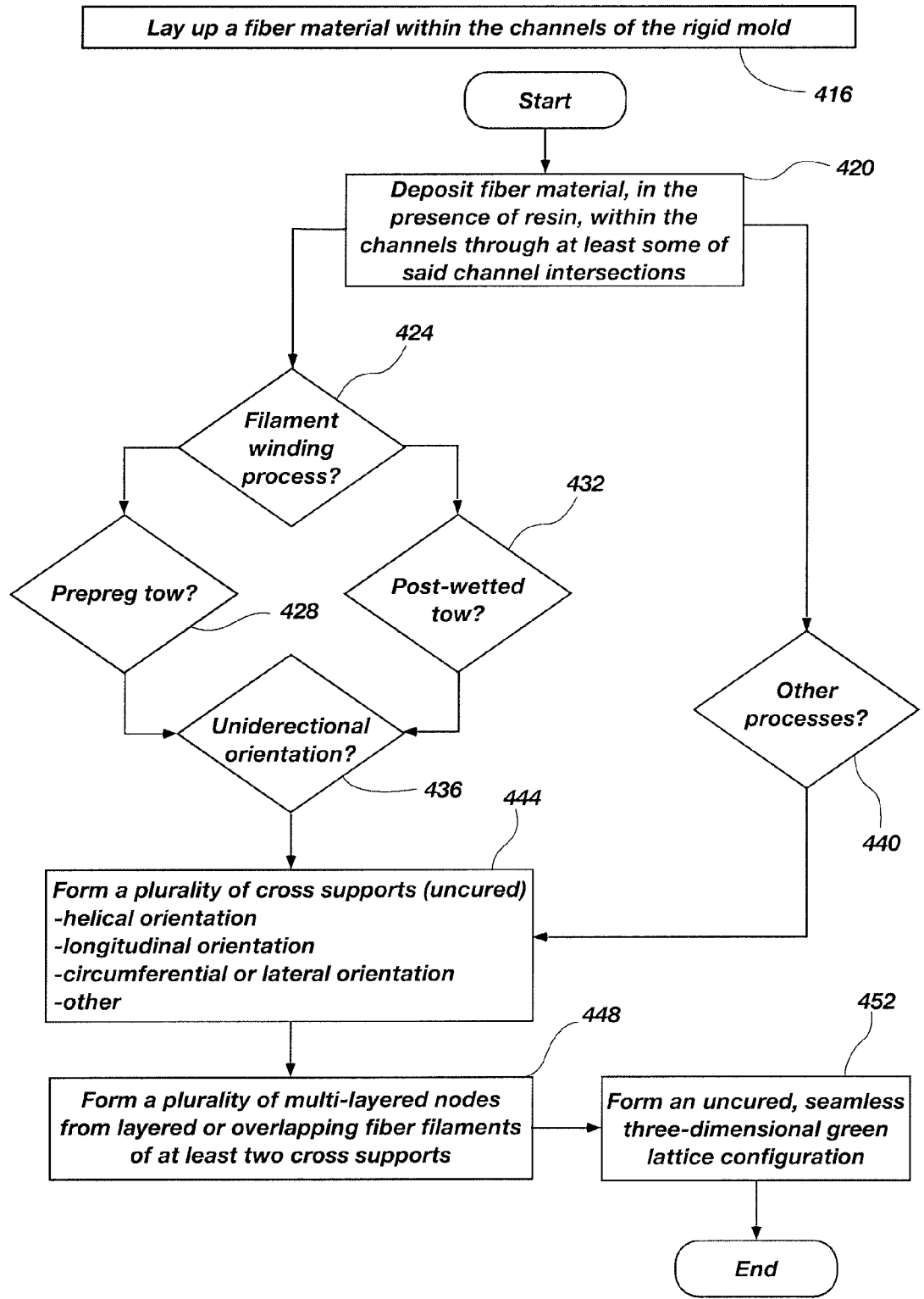
FIG. 19 depicts a flow chart of an exemplary fiber material laying up process.

Turning to FIG. 19, laying up the fiber material within the channels of a rigid mold (416) contributes to the versatility and ease of manufacture of the present invention lattice support structure. This starts with depositing a fiber material, in the presence of resin, within the channels with the fiber materials extending through the intersections formed in the rigid mold (420). Although other methods may be employed (440), this will typically involve a filament winding process (424) using a prepreg tow or towpreg (428) or a post-wetted tow (432) dispensed from a spool at a given tension and speed. Fiber filaments that are deposited within the channels under a relatively high tension generally result in a final product with higher rigidity and strength, while filaments deposited using a lower tension generally result in a final product having more flexibility.

The present invention contemplates that the performance characteristics may be manipulated by manipulating the tow index of the composite lattice support structure. The Tow Index refers to the amount of fiber strands present in the cross supports. For example, a structure comprising 3 wraps of 12K tow in each of the longitudinal and helicals making up the structure will perform differently than a similarly configured structure having 4 wraps of 12K tow in the longitudinal cross supports and 2 wraps of 12K tow in the helical cross supports. The Tow Index may be expressed as follows:

$$TI = N_L N_{LW} + N_H N_{HW}$$

where $N_L$ is the number of longitudinal cross supports in the structure, $N_{LW}$ is the number of tow wraps in each longitudinal cross support, $N_H$ is the number of helical cross supports, and $N_{HW}$ is the number of tow wraps per helical cross support. Similar calculations may be made for other lattice support structures having other types of cross supports.

From the Tow Index, the Force Index can be derived, which describes a scale to which the lattice support structures can be compared. The Force Index is given by:

$$FI = \text{Critical Load}/N_L N_W + N_H N_{HW} = \text{Critical Load}/TI$$

In addition, in one aspect, the fiber material may be laid up to extend in a unidirectional orientation within the channels and through the nodes (436) such that any directional changes at the nodes may be eliminated. For example, by unidirectional it is meant that fiber material deposited in one channel will comprise an axial directional orientation, which fiber material will extend through an intersection with another channel and continue on in the same axial directional orientation past the intersection and into the same channel. In other words, the axial directional orientation is maintained through the channel and the intersection. The same may be said for other channels and the fiber materials deposited therein. As such, any formed node will comprise a plurality of layers of fiber materials from multiple channels, with each of the fiber materials within the node comprising a unidirectional fiber orientation. Unidirectional orientation of the fiber material or fiber filaments contributes to more efficient layering of the fibers, and to the eventual overall strength of the unit once formed. In another aspect, directional changes of the fiber material at the nodes may be provided if desired. However, it is noted that even with directional changes at the nodes, the unidirectional orientation of the fiber materials or filaments within any given channel may be maintained.

Depositing fiber material within the channels of the rigid mold in the presence of a resin leads to the formation of a plurality of green, uncured members that will ultimately become the various types of rigid cross supports (444) and resulting nodes (448) that make up the lattice support structure. Although these members are in a green, uncured or unconsolidated state upon the completion of the filament winding phase, the result is a green, uncured, three-dimensional lattice configuration already having a seamless formation (452) prior to undergoing any curing or consolidation processes.

Figure 20:
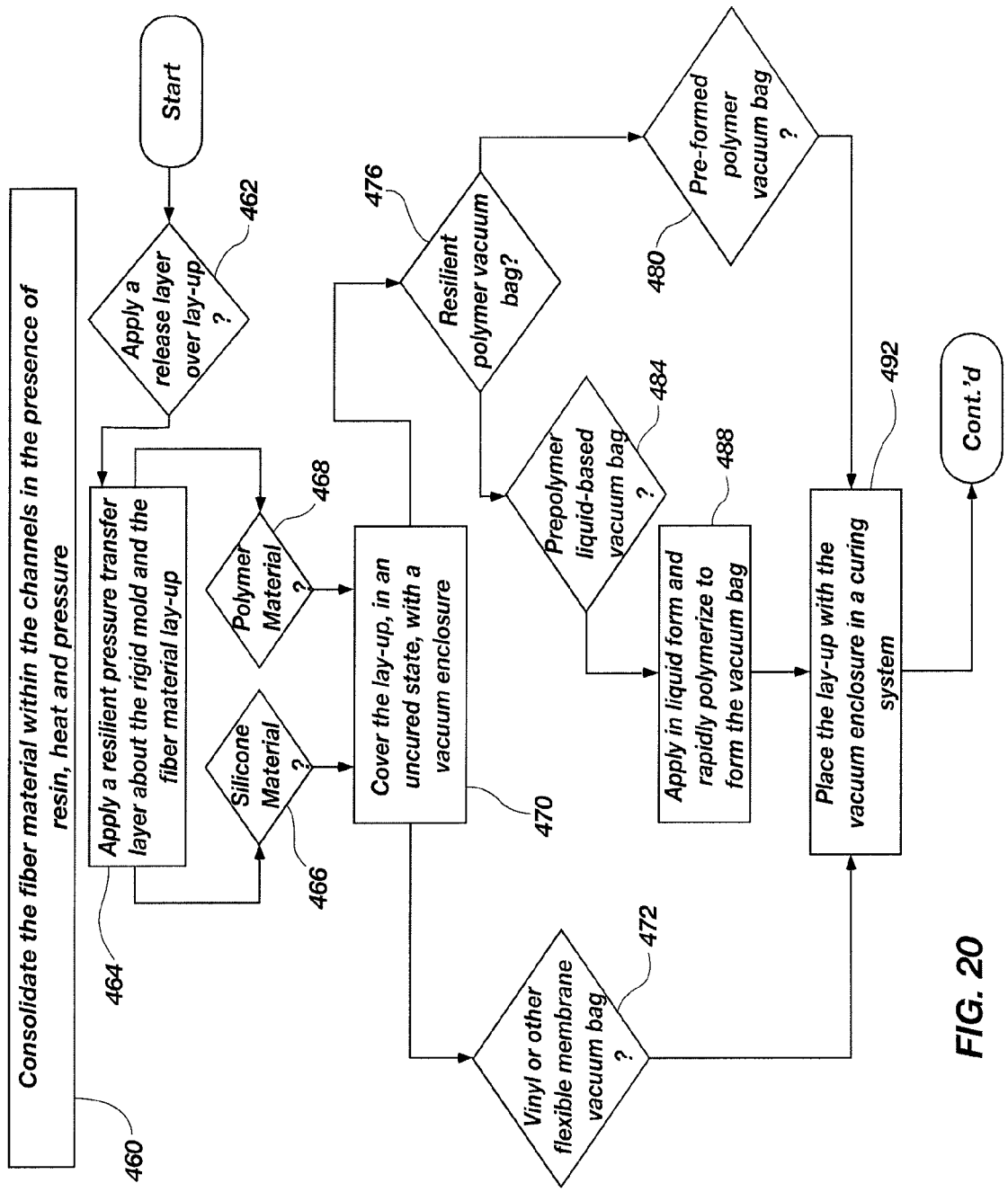
FIG. 20 depicts a flow chart of an exemplary consolidation process used to form the lattice support structure.

With reference to FIG. 20, in one exemplary embodiment, consolidating the uncured fiber material lay-up just described to form the cross supports and nodes (460) comprises applying a pressure transfer layer or PTL about the rigid mold and the fiber-based material lay-up prior to covering the rigid mold and fiber material lay-up with a vacuum enclosure (468). Optionally, a release layer may be situated or applied (464) between the rigid mold and fiber material lay-up and the vacuum enclosure in order to facilitate easier release of the PTL and/or vacuum enclosure from the formed lattice structure. Depending upon the type of vacuum enclosure used, a separate release layer may or may not be necessary.

Applying the PTL about the rigid mold and the fiber-based material lay-up may involve one of applying a silicone or silicone-based layer 466, or alternatively a resilient polymer material 468 as discussed above. Depending upon the type of material, the vacuum enclosure itself may comprise the PTL layer (or vice versa) needed to achieve good consolidation.

In the event a vinyl or other flexible membrane based vacuum bag is used (472), the method will involve placing this over the rigid mold and fiber material lay-up, with a silicone PTL situated therebetween, and subsequently forming one or more vacuum ports therein that can be coupled to a vacuum source. The vacuum bag will also most likely need to be sealed to the surface of the rigid mold about the fiber material lay-up using tacky tape or other sealing means. Alternatively, a resilient polymer vacuum bag may be used (476), which may double as the PTL as well. With this type of vacuum bag, applying it may be carried out in a number of different ways. For example, in a first aspect, a prepolymer composition (484) may be applied in liquid form (488) using a spray gun, brushes, etc. In one exemplary embodiment, the prepolymer liquid rapidly polymerizes under ambient conditions (no elevated heat or pressure) to form the vacuum bag. In another aspect, the polymer vacuum bag may be preformed (480) and applied in a similar manner as a more traditional type of vacuum bag.

Consolidating further comprises placing the lay-up with the vacuum enclosure in a curing system (492) and curing the lay-up in the presence of a vacuum, heat and pressure to cause the vacuum enclosure to compact the fiber material into the channels (496). Drawing a vacuum may comprise fluidly coupling one or more vacuum ports to the lay-up and also to a vacuum source. As a vacuum is drawn, the resulting negative pressure acts to cause the vacuum enclosure to apply a significant increased pressure to the fiber materials situated within the channels through the PTL. As this pressure is applied, the fiber materials begin to compact into or within the channels. Simultaneously, the channel surfaces apply a counteracting force on the fiber materials, constraining their movement or displacement. As heat and pressure is applied for a given duration, the fiber materials consolidate with the resin, and are caused to substantially assume the geometry of the channels, bounded also by the vacuum enclosure (498). Consolidation may continue as long as needed to eliminate or minimize any remaining voids.

Curing the lay-up may comprise placing it in an autoclave. Operation of an autoclave may include an autoclave cycle where the lay-up may be subjected to pressure and heat. An autoclave cycle may comprise the pressurization of a pressurizing medium in an interior region and the application of heat to an interior region, thus subjecting a workpiece to pressure and heat. A pressurizing medium may be any gas or liquid suitable for pressurizing within an interior region at an elevated temperature. Suitable pressurizing media may include nitrogen, carbon dioxide, air, water, inert gas, or any other gas or liquid suitable for the operating conditions during an autoclave cycle. An autoclave may also include a pump to pressurize a pressurizing medium in an interior region. A pump may be external to the pressure vessel and may be associated with the port, such that it pumps the pressurizing medium into the interior region through the port. The interior region may also include ducting and fans to circulate the pressurizing medium in the interior region. Prior to introducing the pressurizing medium into the interior region, gas may be evacuated from the interior region. This may be done to control the atmosphere inside the interior region during the autoclave cycle and/or to reduce the likelihood of contaminating the pressurizing medium. Prior to the autoclave cycle, a pump may be used to evacuate gases from the interior region through the port. At the conclusion of the autoclave cycle, the pressurizing medium may be evacuated from the interior region through the port.

Heat in the autoclave cycle may be provided by a heating element, such that the workpiece may be subjected to heat inside the interior region during the autoclave cycle. The heating element may be any suitable heater capable of producing heat sufficient to raise the temperature of the lay-up to a desired level during an autoclave cycle. Suitable heaters may include electric resistance heaters or steam heaters. The heating element may be located external to the pressure vessel or internal to the pressure vessel.

The autoclave and the pressurizing medium in the interior region of the pressure vessel may be configured to retain a portion of the thermal energy gained from a previous autoclave cycle. In other words, the use of a pre-heated curing system is contemplated as one exemplary process. It has been discovered that in some circumstances, temperature ramp up and ramp down can be significantly reduced by placing the lay-up in a pre-heated curing system, and then immediately removing the formed part once consolidation and curing has taken place. For instance, the cured part may be removed at temperatures still around 200 degrees F. An active cooling process step may be included to actively cool the various components and the finished part, but this would most likely take place outside of the curing system. A holding tank may be insulated to preserve the thermal energy of the pressurizing medium and/or to prolong a time interval before it may be reintroduced into interior region for another autoclave cycle.

In another embodiment, the pressurizing medium in the interior region of the pressure vessel may retain thermal energy gained from a prior autoclave cycle and another autoclave pressure vessel altogether. In other words, the pressurizing medium may have been used in one autoclave for a cycle and then transferred to a second autoclave for use in a second cycle while it is still hot. Transfer of pressurizing medium from one autoclave to another may be done via a holding tank or it may be transferred directly from autoclave to autoclave.

Being able to manipulate the cross-sectional geometry of the cross sectional shape of the individual cross supports is a significant advantage of the present invention lattice support structure manufacturing method. This provides the ability to control or manipulate the moment of inertia of the cross support members. For example, the difference in inertial moments of a flat unit of about 0.005" thickness and a T-shaped unit of the same amount of material can reach up to and beyond a factor of 200. With the use of a r, pressure application, and resin/temperature curing, measurement has shown that geometric tolerances can be kept at less than 0.5%.

It has been recognized that the closer the fibers are held together, the more they act in unison as a single piece rather than a group of fibers. In composites, resin can facilitate holding the fibers in close proximity to each other both in the segments of the cross supports themselves, and at the multi-layered nodes when more than one directional path is being taken by groups of unidirectional layered fibers. In filament winding systems of the present disclosure, composite tow or roving or tape (or other shaped filaments) can be wound and shaped into the channels of a rigid mandrel, and then the composite fibers forced together using pressure. Under this pressure, heat can be used to fuse the multi-layered nodes, generating a tightly consolidated multi-layered node. Thus, the multi-layered node is constrained within the channels or otherwise held in place tightly using pressure from both the vacuum enclosure and the surfaces of the channels. Under such pressure from all sides, the multi-layered node (including the filament or tow material and the resin) can be heat fused or cured, making the multi-layered node more highly compacted and consolidated than other systems in the prior art. As a result, high levels of consolidation (90-100% or even 98-100%) can be achieved. In other words, porosity of the consolidated material providing voids and weak spots in the structure are significantly reduced or even virtually eliminated. In short, consolidation control using a rigid mandrel, pressure over the wound filament or fibers, and resin/heat curing provides high levels of consolidation that strengthen the lattice structure as a whole.

Referring again to FIG. 18, the method may further comprise removing the vacuum enclosure and separating the composite lattice support structure from the rigid mold (506). This may include collapsing the rigid mold to relieve the internal pressure acting on the finished lattice support structure. In terms of further finishing the formed lattice support structure (510), this may include trimming edges or ends, deburring and/or sanding where necessary etc. This may also include coating the surfaces of the support structure with a finishing coat. For example, in one aspect, this may comprise spraying the surfaces with the same VacuSpray material described above, or another similar type of protective coating.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

More specifically, while illustrative exemplary embodiments of the invention have been described herein, the present invention is not limited to these embodiments, but includes any and all embodiments having modifications, omissions, combinations (e.g., of aspects across various embodiments), adaptations and/or alterations as would be appreciated by those skilled in the art based on the foregoing detailed description. The limitations in the claims are to be interpreted broadly based on the language employed in the claims and not limited to examples described in the foregoing detailed description or during the prosecution of the application, which examples are to be construed as non-exclusive. For example, in the present disclosure, the term "preferably" is non-exclusive where it is intended to mean "preferably, but not limited to." Any steps recited in any method or process claims may be executed in any order and are not limited to the order presented in the claims. Means-plus-function or stepplus-function limitations will only be employed where for a specific claim limitation all of the following conditions are present in that limitation: a) "means for" or "step for" is expressly recited; and b) a corresponding function is expressly recited. The structure, material or acts that support the means-plus function limitation are expressly recited in the description herein. Accordingly, the scope of the invention should be determined solely by the appended claims and their legal equivalents, rather than by the descriptions and examples given above.

What is claimed and desired to be secured by Letters Patent is:

1. A method for forming a composite lattice support structure having a plurality of cross supports intersecting one another to form a plurality of multi-layered nodes, said method comprising:
   obtaining a rigid mold having a working surface with a network of channels intersecting at strategic locations, said channels cooperatively establishing a substantially continuous interconnected lattice corresponding to a three dimensional geometric configuration to be imparted to a composite lattice support structure;
   depositing a fiber material, in the presence of a resin, within said channels to provide a fiber material lay-up systematically arranged to contribute to the makeup of a plurality of composite cross supports that intersect to form a plurality of nodes;
   applying a dynamic pressure transfer layer about said rigid mold and said fiber material lay-up, said pressure transfer layer being resilient and adapted to displace about said working surface and concentrate an applied pressure about said channels and onto said fiber material lay-up to compact said fiber material within said channels;
   forming a vacuum enclosure about said fiber material lay-up and said rigid mold to facilitate drawing of a vacuum;
   subjecting said fiber material lay-up to a curing cycle to consolidate said fiber material to form said lattice support structure having said cross supports and said nodes; and
   releasing said lattice support structure from said rigid mold;
   wherein said pressure transfer layer comprises a liquid material curable under ambient conditions adapted to be applied to and seal said rigid mold and to comprise and function as said vacuum enclosure.

2. The method of claim 1, wherein said subjecting said lay-up to elevated temperature and pressure comprises placing said lay-up, in an uncured state, within a pre-heated, elevated temperature environment to rapidly increase a rate of temperature increase of said lay-up.

3. The method of claim 2, further comprising immediately removing said formed lattice support structure, at said elevated temperature, from said elevated temperature environment and placing it into an ambient temperature environment to instantly remove exposure to said elevated temperatures.

4. The method of claim 3, further comprising actively cooling said formed lattice support structure upon removal from said elevated temperature environment.

5. The method of claim 1, wherein said pressure transfer layer comprises a silicone material.

6. The method of claim 1, wherein said forming a vacuum enclosure about said rigid mold and said fiber material comprises:
   applying said liquid material, wherein said liquid material comprises a prepolymer composition about said rigid mold, said prepolymer composition functioning as said vacuum enclosure and said pressure transfer layer;
   sealing said vacuum bag to said rigid mold.

7. The method of claim 6, wherein said prepolymer composition is in liquid form and polymerized after being applied about said rigid mold, and wherein said sealing comprises extending application of said prepolymer composition to a surface of said rigid mold.

8. The method of claim 1, further comprising facilitating an expansion of said fiber material within said channels, without overstressing particles of said fiber material, for the purpose of increasing the pressure curve across said lattice support structure and optimizing said consolidation.

9. The method of claim 1, wherein said obtaining said rigid mold comprises configuring a mandrel to comprise a plurality of rigid grooves formed in a surface thereof, at least some of said plurality of grooves intersecting at strategic locations.

10. The method of claim 9, further comprising configuring said mandrel to be collapsible, with several component parts facilitating selective assembly and disassembly of said mandrel.

11. The method of claim 1, wherein said formed lattice support structure comprises a seamless configuration.

12. The method of claim 1, wherein said depositing a fiber material comprises pre-determining a type of fiber material, a size of fiber material, a fiber count and an index or amount of fiber material to be deposited within said channels, based on one or more desired performance characteristics of said lattice support structure.

13. The method of claim 1, wherein said depositing a fiber material comprises depositing said fiber material in accordance with a pre-determined number of layers to be present within said node, said node comprising a multi-layered node with at least one layer of fiber material within a first channel situated between at least two layers of fiber material within a second channel at an intersection of said first and second channels.

14. The method of claim 1, wherein said depositing a fiber material comprises winding a fiber-based tow onto said rigid mold in accordance with a pre-determined winding process, said channels providing a secure pathway for said tow.

15. The method of claim 14, wherein said fiber-based tow is subjected to a resin component in situ during said winding process and as it is to being deposited within said channels.

16. The method of claim 14, wherein said fiber-based tow comprises a preimpregnated tow or towpreg.

17. The method of claim 1, further comprising applying a release layer about said rigid mold and said fiber material beneath said vacuum enclosure to facilitate release of said lattice structural support from said vacuum enclosure.

18. The method of claim 1, further comprising maintaining a direction and deposited path of said fiber material through an intersection of said channels, such that any formed cross support and multi-layered node comprises unidirectional fiber materials prior to said consolidating.

19. The method of claim 1, further comprising configuring said rigid mold and said channels to form a structural support having a uniform cross-section taken along a longitudinal length of said support structure.

20. The method of claim 1, further comprising configuring said channels to define one or more of a helical channel, a reverse helical channel, a longitudinal channel, a lateral channel, a transverse channel, and any combination of these.

21. The method of claim 1, further comprising configuring said channels to be curved between intersections.

22. The method of claim 1, further comprising containing said cross supports and said multi-layered nodes within a common radial plane, such that said support structure comprises substantially no protruding elements.

23. The method of claim 1, further comprising layering multiple layers of said fiber material within said channels.

24. The method of claim 1, further comprising configuring said support structure to comprise a circumferentially open geometry.

25. A system for forming a composite lattice support structure, said system comprising:
   a rigid mold having a working surface with a network of channels intersecting at strategic locations, said channels cooperatively establishing a substantially continuous interconnected lattice corresponding to a three dimensional geometric configuration to be imparted to a composite lattice support structure;
   a fiber material deposited, in the presence of a resin, within said channels to provide a fiber material lay-up systematically arranged to contribute to the makeup of a plurality of composite cross supports that intersect to form a plurality of nodes;
   a dynamic pressure transfer layer situated about said rigid mold and said fiber material lay-up, said pressure transfer layer being resilient and adapted to displace about said working surface and concentrate an applied pressure about said channels and onto said fiber material lay-up to compact said fiber material within said channels;
   a vacuum enclosure situated about said fiber material lay-up and said rigid mold to facilitate drawing of a vacuum; and
   a curing system adapted to consolidate said fiber material to form said lattice support structure having said cross supports and said nodes,
   wherein said pressure transfer layer comprises a liquid material curable under ambient conditions adapted to be applied to and seal said rigid mold and to comprise and function as said vacuum enclosure.

\* \* \* \* \*